United States Patent [19]

Altom et al.

[11] Patent Number: 5,627,978
[45] Date of Patent: May 6, 1997

[54] GRAPHICAL USER INTERFACE FOR MULTIMEDIA CALL SET-UP AND CALL HANDLING IN A VIRTUAL CONFERENCE ON A DESKTOP COMPUTER CONFERENCING SYSTEM

[75] Inventors: Mark W. Altom, Plainfield; Richard L. Pastore, Brick; Diane L. Quarles, Wall; Dirk Ruiz, Highland Park, all of N.J.

[73] Assignee: Lucent Technologies Inc., Murray Hill, N.J.

[21] Appl. No.: 357,811

[22] Filed: Dec. 16, 1994

[51] Int. Cl.⁶ ................................................ G06F 15/00
[52] U.S. Cl. ...................... 395/330; 395/342; 395/349
[58] Field of Search .................................. 395/153, 155, 395/157, 161; 379/201–205

[56] References Cited

U.S. PATENT DOCUMENTS

| | | | |
|---|---|---|---|
| 4,653,090 | 3/1987 | Hayden | 379/204 |
| 4,763,356 | 8/1988 | Day, Jr. et al. | 395/161 |
| 4,899,136 | 2/1990 | Beard et al. | 340/706 |
| 4,939,507 | 7/1990 | Beard et al. | 340/706 |
| 4,953,159 | 8/1990 | Hayden et al. | 395/161 |
| 5,065,309 | 11/1991 | Putnam et al. | 364/419 |
| 5,107,443 | 4/1992 | Smith et al. | 395/158 |
| 5,195,086 | 3/1993 | Baumgartner et al. | 395/161 |
| 5,208,912 | 5/1993 | Nakayama et al. | 395/200.04 |
| 5,309,509 | 5/1994 | Cocklin et al. | 379/165 |
| 5,353,398 | 10/1994 | Kitahara et al. | 395/153 |
| 5,363,507 | 11/1994 | Nakayama et al. | 395/800 |
| 5,491,743 | 2/1996 | Shiio et al. | 379/202 |

OTHER PUBLICATIONS

Kobayashi et al., Virtual conference room: a metaphor for multi-user real-time conferencing systems, Proc. of 1993 2nd IEEE Int'l. Workshop on Robot and Human Communication, pp. 430–435. Nov. 1993.

Pihlman et al., "Personal Telepresence: an interactive multimedia workstation", Proc. of the SPIE—the Int'l Society for Optical Engineering, v. 2188, pp. 105–108. Feb. 1994.

Sakata, "Development and evaluation of an in–house multimedia desktop conference system", IEEE Journal on Selected Areas in Communications, v. 8, No. 3, pp. 340–347. Apr. 1990.

ACM 0–89791–261–6/88/0003/0001, 1988, pp. 1–8, authored by S.R. Ahuja, J.Robert Ensor and David N. Horn, entitled "The Rapport Multimedia Conferencing System".

(List continued on next page.)

Primary Examiner—Heather R. Herndon
Assistant Examiner—Joseph R. Burnell
Attorney, Agent, or Firm—Thomas Stafford

[57] ABSTRACT

A graphical user interface, i.e., multimedia communications application program, for setting up and handling a multimedia call is disclosed that employs realistic metaphors of real life face-to-meetings in setting up and handling a multimedia call to establish a virtual meeting which is automatically reconfigured in response to user action. This is realized by taking advantage of prospective virtual meeting participants' already existing knowledge of how real life face-to-face meetings operate. To this end, the multimedia communications application program enables the virtual meeting participants through direct manipulation of the realistic graphical metaphors to establish a realistic virtual meeting room which is displayed on the screen of their workstation monitor. The virtual meeting room includes a table and chairs arranged in a realistic manner in the virtual meeting room. The virtual meeting room and table are automatically configured in response to user action in such a manner as to minimize the screen area displaying the virtual meeting room and, thereby, maximizing the screen area available for multimedia collaboration by the meeting participants. An empty chair is displayed at the table which indicates that at least one more participant can be added to the virtual meeting. Once a predetermined maximum number of participants have been included in the virtual meeting, the empty chair is no longer displayed.

26 Claims, 40 Drawing Sheets

OTHER PUBLICATIONS

E–Team by LANimations Inc., 68 Santa Fe Avenue, Hamden CT 06517 USA, (203) 288–1010, E–Team Product Description and E–Team Demo Tutorial, pp. 1–6, 1992.

Human Factors in Telecommunications 13th International Symposium, Torino, Italy, Sep. 10–14, 1990, pp. 41–48, authored by Raymond W. Bennett and Joseph G. Klinger, entitled "Conceptual Models of Telephony and Their Implications For Interface Design".

Transactions of the Information Processing Society of Japan, 0387–5806, vol. 34/11, pp. 2320–2328, authored by T. Kanba and O. Hashimoto, entitled "Reality User Interface—A Step Toward Multimedia User Interface", Nov. 1993.

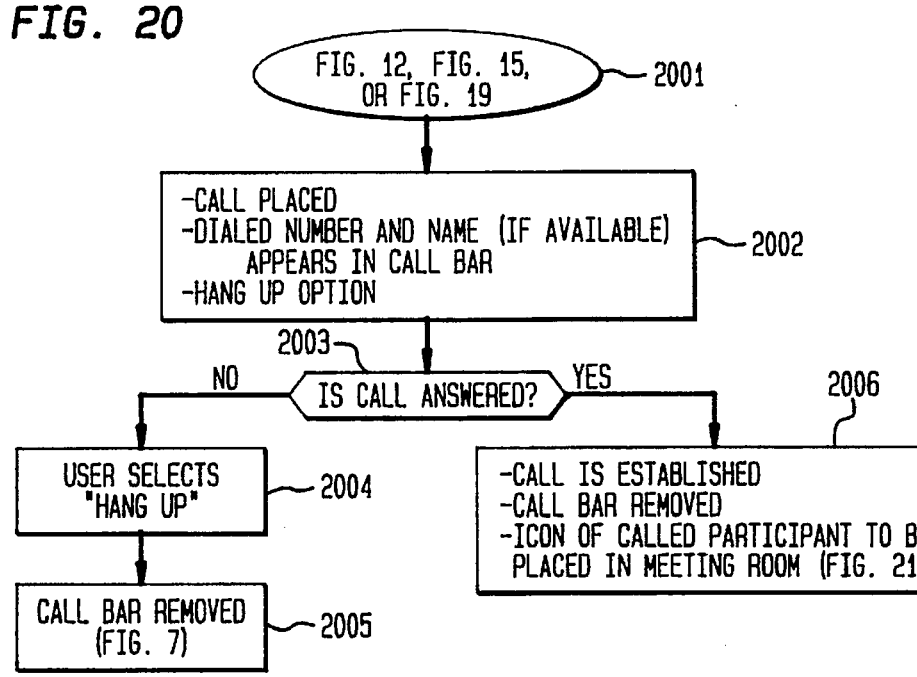
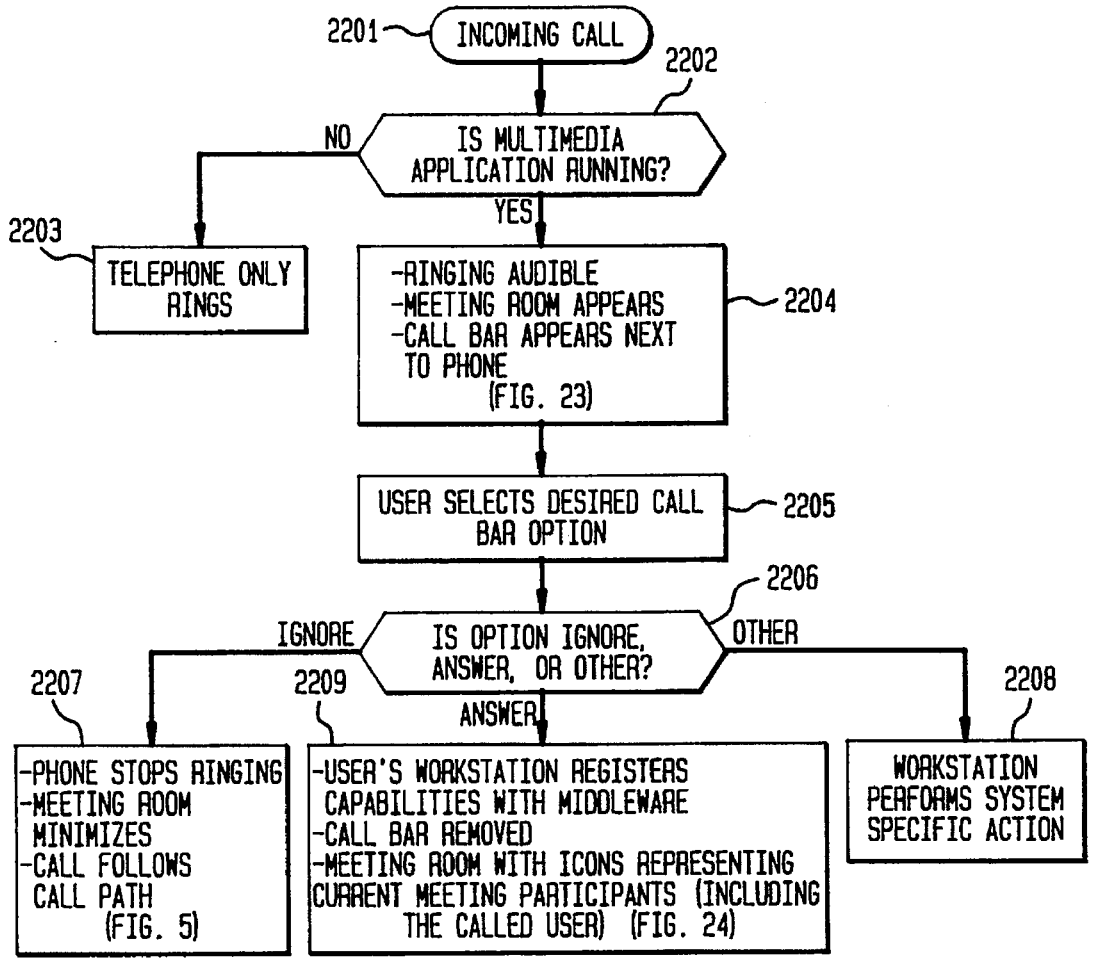

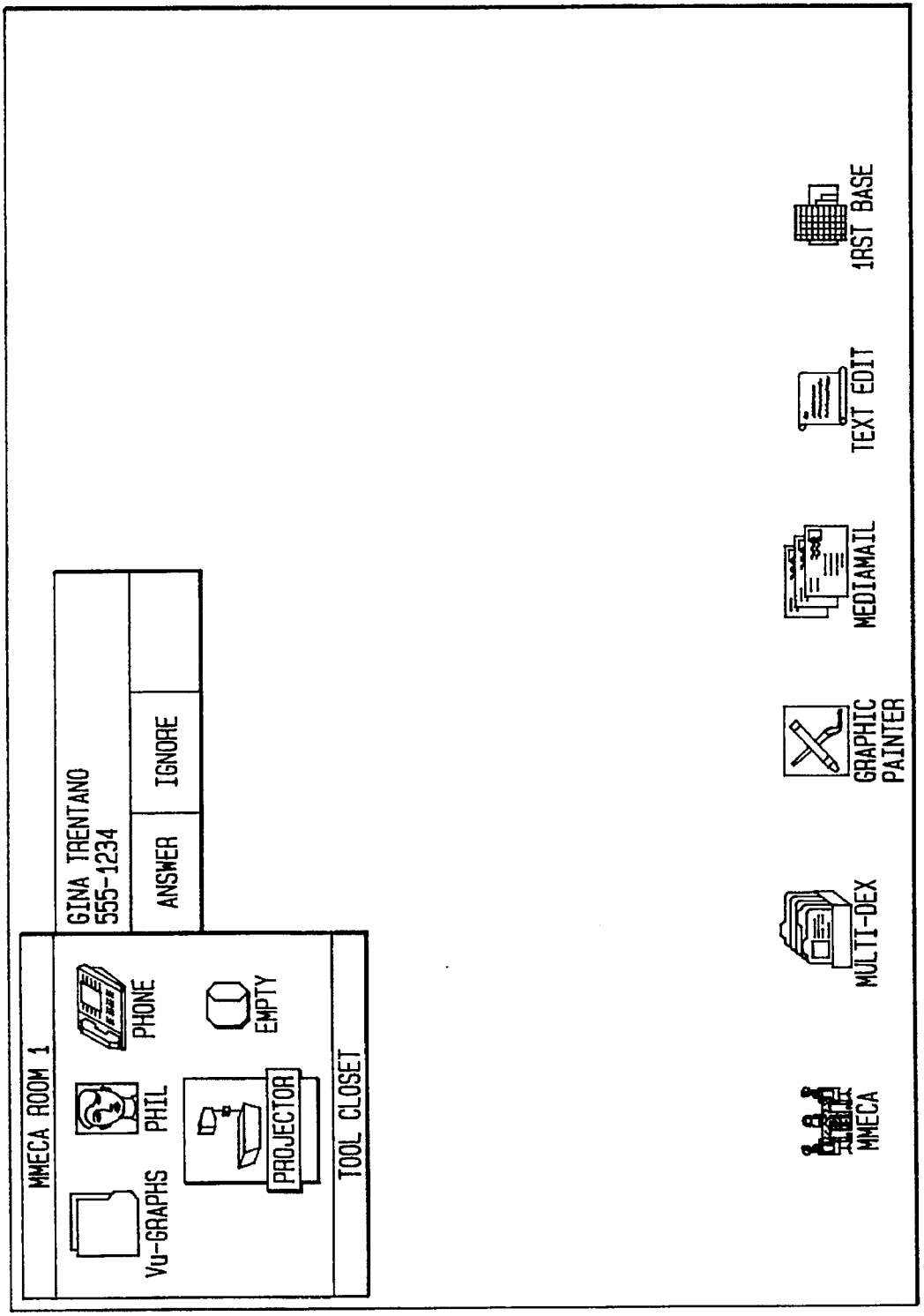

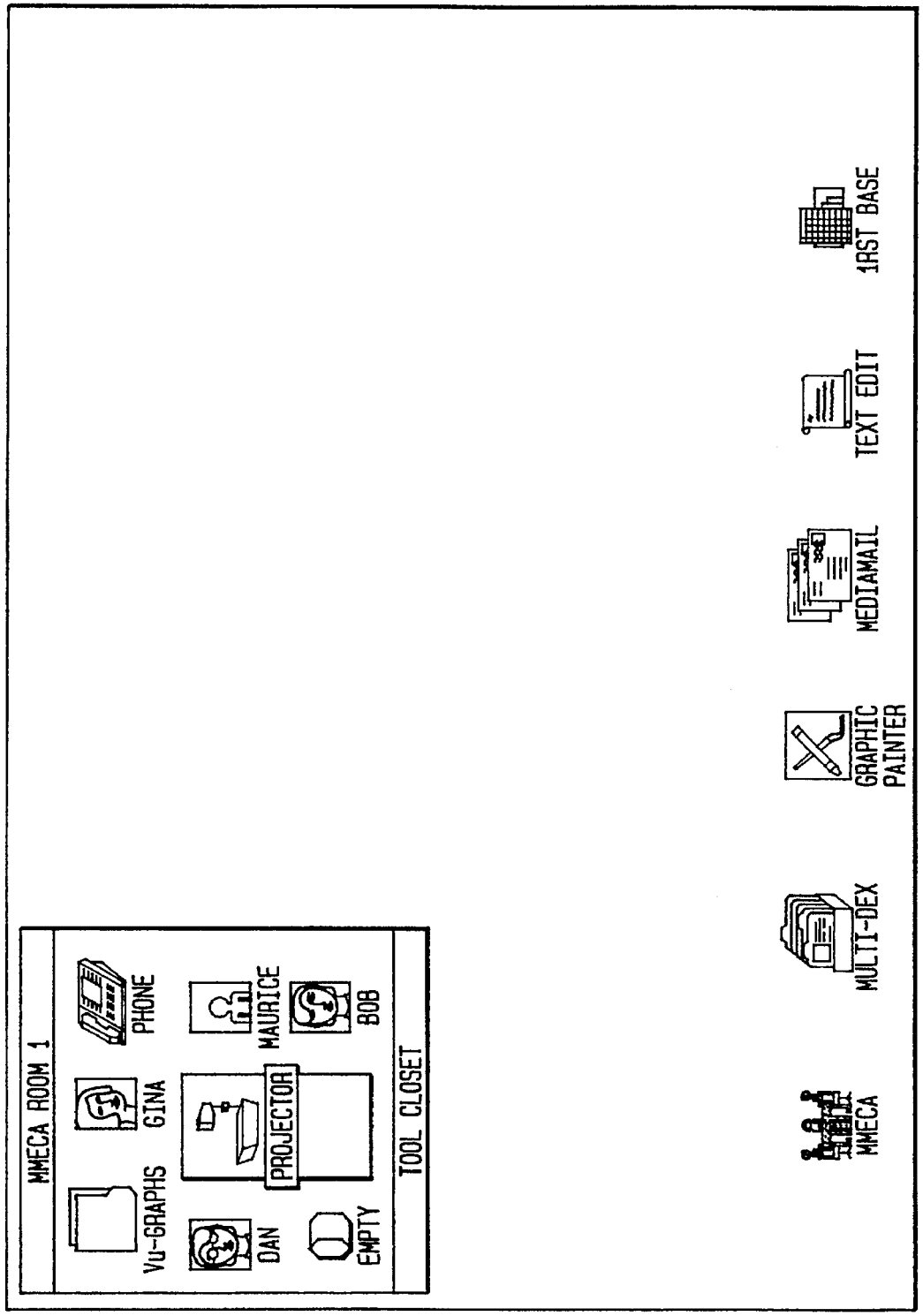

GRAPHICAL USER INTERFACE FOR MULTIMEDIA CALL SET-UP AND CALL HANDLING IN A VIRTUAL CONFERENCE ON A DESKTOP COMPUTER CONFERENCING SYSTEM

CROSS-REFERENCE TO RELATED APPLICATION

This application is related to U.S. patent application Ser. No. 08/357,809 and U.S. patent application Ser. No. 08/358, 214 which were filed concurrently herewith.

TECHNICAL FIELD

This invention relates to telecommunications networks and, more particularly, to multimedia communications networks for providing flexible multimedia telephone service and the like including video, voice and/or data.

BACKGROUND OF THE INVENTION

The essential characteristics of face-to-face meetings can be simulated by multimedia telecommunications conference systems. Such conference systems permit separated meeting participants to communicate with one another in multiple media such as video voice and/or data from their own workplace without requiring that they convene in the same place.

In prior known multimedia conference systems, it has been required that the individual meeting participants had to be conversant with sophisticated video and data communications protocols, including, for example network address and transport protocols, in order to set-up and handle a multimedia call in order to establish and operate a virtual meeting. If a prospective participant was not familiar with the video and/or data protocols, it essentially precluded his or her participation in the full virtual meeting. Those prospective participants would be limited to only the audio portion of the virtual meeting. This of course is extremely undesirable. Therefore, a problem exists in providing an easy natural real life way for unsophisticated prospective meeting participants to set-up and handle multimedia telephone calls.

SUMMARY OF THE INVENTION

The problems and limitations with prior multimedia telecommunications conference systems are overcome by utilizing a graphical user interface (multimedia communications application program) that employs realistic metaphors of real life face-to-face meetings in setting up and handling a multimedia call to establish a virtual meeting which is automatically reconfigured in response to user action. This is realized by taking advantage of prospective virtual meeting participants' already existing knowledge of how real life face-to-face meetings operate. To this end, the multimedia communications application program enables the virtual meeting participants through direct manipulation of the realistic graphical metaphors to establish a realistic virtual meeting room metaphor which is displayed on the screen of their workstation monitor. The virtual meeting room includes a table and chairs arranged in a realistic manner in the meeting room. The virtual meeting room and table are automatically configured in response to user action in such a manner as to minimize the screen area displaying the virtual meeting room and, thereby, maximizing the screen area available for multimedia collaboration by the virtual meeting participants. In one embodiment, an empty chair is displayed at the table which indicates that at least one more participant can be added to the virtual meeting. Once a predetermined maximum number of participants have been included in the virtual meeting, the empty chair is no longer displayed. In a specific example, the multimedia call is established by use of a realistic telephone icon that looks and operates like an ordinary real life telephone.

BRIEF DESCRIPTION OF DRAWING

FIG. 20 is a flow chart illustrating the steps taken once the call is placed;

FIG. 22 is a flow chart illustrating the steps which are taken upon receipt of an incoming call at a user workstation;

FIG. 23 is a graphical screen representation illustrating the name and phone number of the calling party;

FIG. 44 is a graphical screen representation illustrating the shrinking of the size of the meeting room.

DETAILED DESCRIPTION

Figure 1:
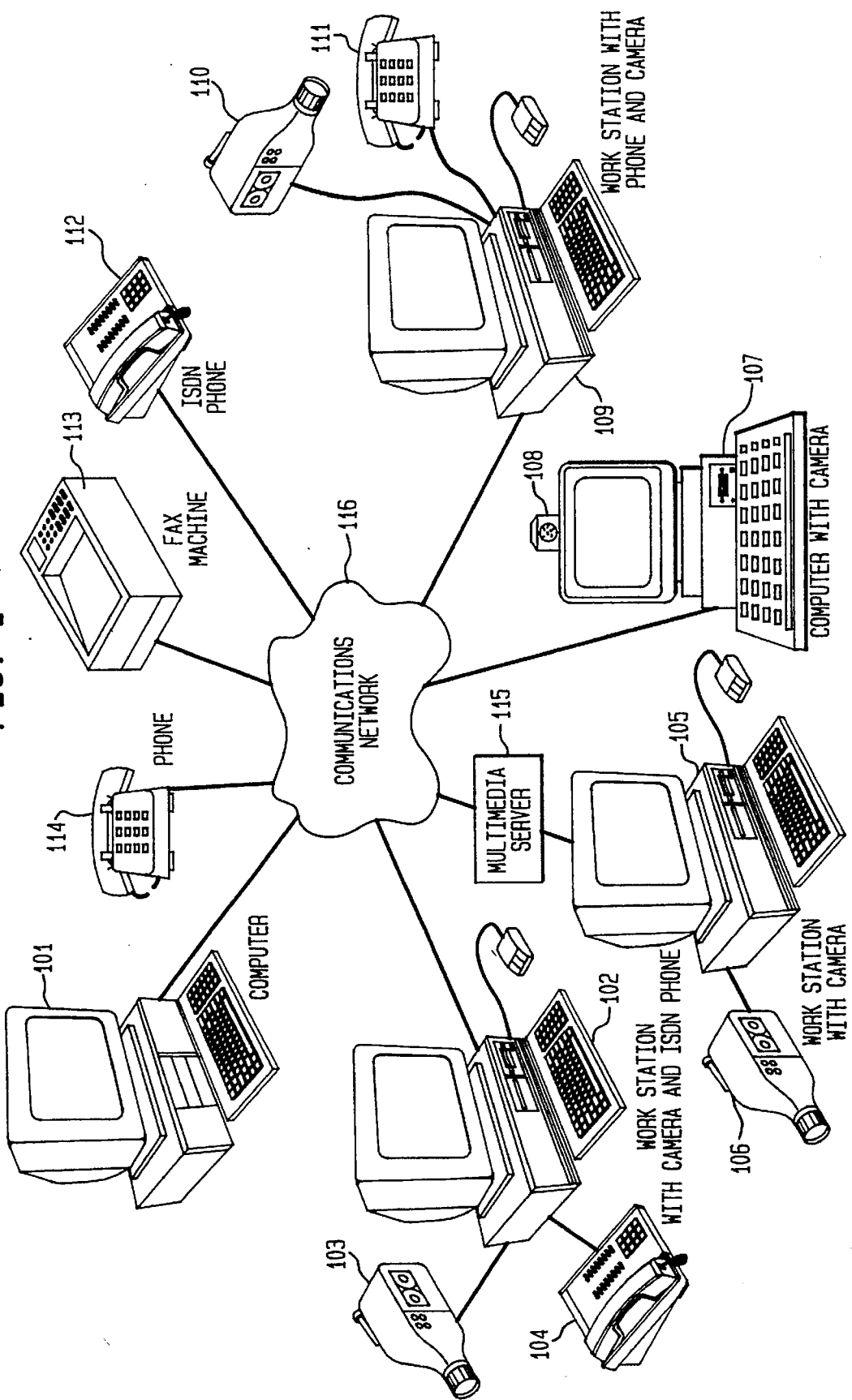
FIG. 1 is an example of a multimedia telecommunications system in which the invention may be employed.

FIG. 1 shows an example of multimedia telecommunications system 100 in which an embodiment of the invention may be readily employed. Individual users at different work locations can set-up a multimedia conference call via a number of different desktop communications devices. As shown, the desktop communications devices may include, but are not limited to, personal computer 101 with built in microphone for audio, workstation 102 including an attached video camera 103 and ISDN telephone 104, workstation 105 with attached video camera 106, personal computer 107 with an integrated video camera 108, workstation 109 including video camera 110 and an analog telephone 111, ISDN telephone 112, facsimile (FAX) machine 113 and, finally, analog telephone 114. It should be noted that personal computer 101 does not provide local user video to the meeting, FAX machine 113 only provides FAX service and ISDN telephone 112 and analog telephone 114 only provide audio access to the meeting. The personal computers and workstations may be any of those known in the art, for example, personal computers and/or workstations commercially available from AT&T Corp., Apple Computer Inc., Sun Microsystems Inc. and others.

The several different desktop communications devices are interconnected via communications network 116. Note that workstations 101, 102, 107 and 109, and ISDN telephone 112, facsimile machine 113, and analog telephone 114 are directly connected to communications network 116, while workstation 105 is connected through multimedia server 115 to communications network 116. In this example, communications network 116 could be, for example, a long distance telecommunications network such as a long distance network provided by AT&T. It may be connected to a number of local telephone networks provided by local exchange carriers or alternate access vendors to provide access to the different desktop communications devices. Alternatively, communications network 116 could be a wide band area network, a local area network or the like. Typically, communications network 116 may include the usual public switched long distance network composed of a plurality of well known digital switching units and may contain one or more packet networks. Additionally, communications network 116 may include known video conference bridge arrangements capable of conferencing video, audio and/or data bit streams among the different desktop communication devices. Communications network 116 may also include multimedia multipoint control units (MCUs) that provide multimedia call capability including video, audio and/or data bit streams. Such MCU units are known and are described in Bell Core Generic Requirements GR-1337-CORE, Issue 1, September 1993 and entitled "Multipoint Multimedia Conferencing Control Unit". Furthermore, communications network 116 may include an asynchronous transport mode (ATM) network capable of transporting and switching multimedia calls including video, audio, and/or data bit streams.

As indicated above, workstation 105 is connected via multimedia server 115 to communications network 116. Multimedia server 115 provides for one or more video, one or more audio and one or more data bit streams to be combined, while maintaining the integrity of those bit streams for transmission to communications network 116, for workstation 105 and the other desktop communications devices in a particular meeting including workstation 105. The functionality of multimedia server 115 can be provided for a particular workstation locally, as shown in relationship to workstation 105, and for the other desktop communications devices in a meeting including workstation 105. It is noted that for the other desktop communications devices in a meeting not including workstation 105 and multimedia server 115, communications network 116 must provide the multimedia server functionality for them.

Thus, communications network 116, which is not part of this invention, provides the functionality including the multimedia server functionality, when necessary, for interconnecting selected ones of the desktop communications devices in particular virtual meetings, as desired.

Figure 2:
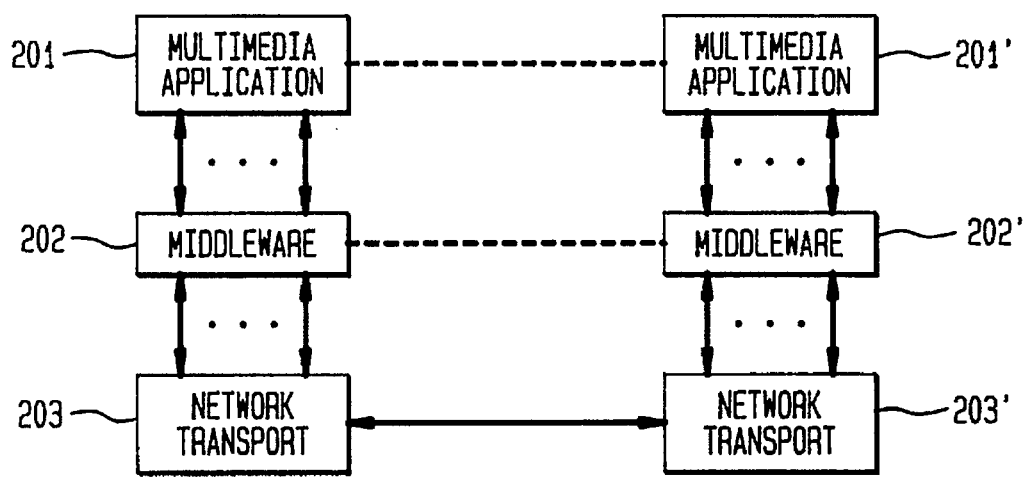
FIG. 2 shows, in simplified block diagram form, the relationships between the multimedia communications application program (hereinafter multimedia application), middleware and the communications network.

FIG. 2 illustrates in simplified block diagram from how multimedia application, i.e., the graphical user interface, 201 (201') located on the user personal computer or workstation communicates via application program interfaces that connect to middleware 202 (202'). Note that the solid lines in FIG. 2 denote direct connectivity between elements 201 through 203 and 203' through 201', and vice versa, while the dotted lines denote logical connectivity between, for example, elements 201 and 201', and 202 and 202'. Middleware 202 (202') is software that is located at the workstation and also distributed among intelligent points in communications network 116. Middleware 202 (202') serves to isolate the multimedia application from platform differences (e.g., UNIX versus MS-DOS and the like) and communications network 116 details. Middleware 202 (202') also serves as a link between the workstation application programs, for example, 201, and network transport 203 server functions, as well as, applications that include, but are not limited to, multimedia call connection setup, directory services of people and network resources, information services, messaging services, and the like. When a user places or receives a multimedia call from his or her workstation, the workstation automatically registers its capabilities with middleware 202 (202'). Middleware 202 (202') employs the registered capabilities to control call setup and transmission of video, audio and/or data. Since, all the capabilities (e.g., full-video, shared data, facsimile, audio and the like) from all of the meeting participants' workstations are registered with middleware 202 (202'), it is available to all of the meeting participants. When information is to be transmitted to participants in the multimedia meeting, middleware 202 (202') determines the proper display formats and transport protocols. Such middleware is known in the art, see for example, an article entitled "Middleware's Next Step: Enterprise-Wide Applications", *Data Communications*, Sept. 1992, pages 157–164 and an article entitled "Closeup Middleware: Networking's Silly Putty", *Communications Week*, Jun. 20, 1994, pages 48–49.

Figure 3:
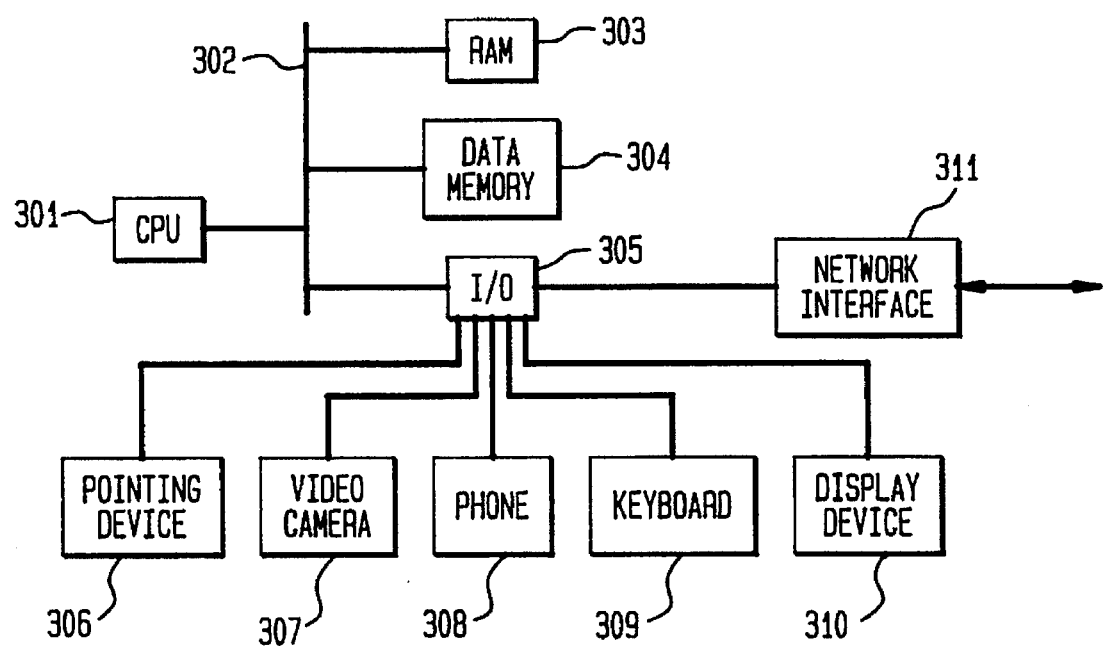
FIG. 3 shows, in simplified block diagram form, details of a workstation which may be employed in practicing the invention.

FIG. 3 shows, in simplified block diagram for details of a user's workstation. Specifically, shown is central processing unit (CPU) 301 which is interconnected via bus 302 to random access memory (RAM) 303, data memory 304, which may be a ROM, and input/output (I/O) unit 305. I/O 305 interfaces pointing device 306, video camera 307, if available, telephone 308, analog or ISDN if available, keyboard 309, and display device 310 to bus 302 and to network interface 311. Such workstations units are known in the art and commercially available, as indicated above, and provide shared data capabilities. Network interface 311 comprises an application program interface that translates computer application requests into the appropriate transport format for transmission via communications network 116 and also takes requests from communications network 116 and translates them into a format appropriate for interacting with the workstation's applications program. Such arrangements are known in the art. It is further noted that transmission from a user workstation to communications network 116 may be via any of a number of transmission arrangements for example, digital data system (DDS), basic rate interface (BRI) ISDN, primary rate interface (PRI) ISDN, a modem, analog transmission, digital transmission, facsimile transmission, or the like. It is noted that a mouse, track ball, touch screen, keyboard cursor control keys or the like may be employed as a pointing device.

Figure 4:
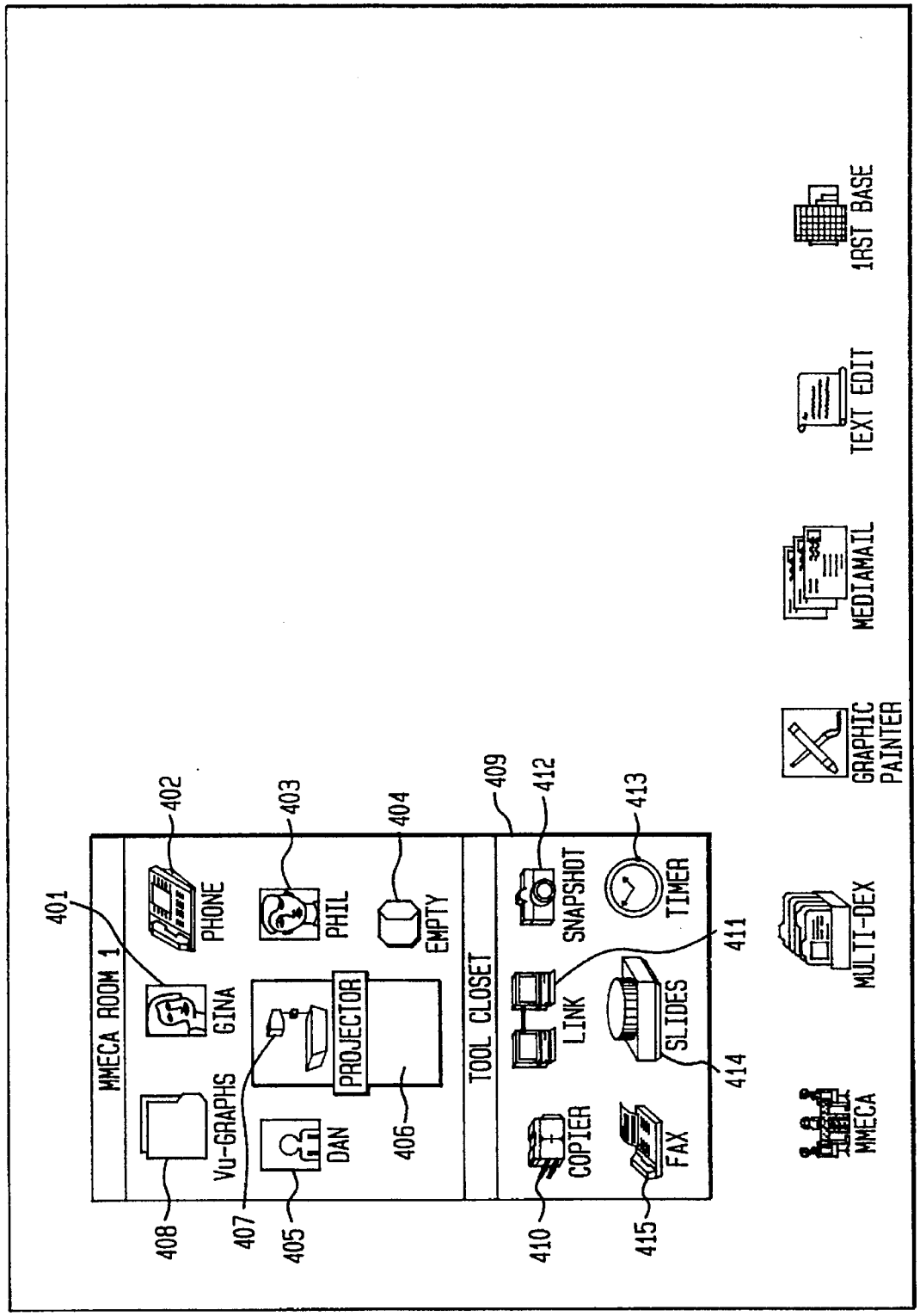
FIG. 4 is a graphical screen representation of the realistic graphical meeting room metaphor.

FIG. 4 is a graphical screen representation of the real life meeting room metaphor illustrating the various components that could be included in a multimedia meeting. Shown in FIG. 4 is image icon 401, illustrating the image of the originator of the meeting, realistic telephone 402 which is used to place and receive multimedia calls, image icon 403 of a participant in the meeting, empty chair 404 which is available for an additional participant to be included in the meeting, generic image icon 405 which would be employed for a participant whose bit map image is not available, table 406 on which objects can be placed to be shared among the meeting participants, projector 407 which is shown on table 406 and may be utilized to share images among the participants, and view graph folder 408 which contains images that can be placed on the projector 407. Also, shown in FIG. 4 is tool closet 409, which includes the multimedia tools that may be utilized during a multimedia meeting by the participants. Shown in tool closet 409, in this example, are copier 410 which may be utilized by the participants to send computer files from one participant to one or more of the other participants, application sharer (link) 411 which enables the participants to share a computer application program, screen snapshot camera 412 which is used to create a view graph by taking a snapshot of any portion of the monitor screen, call timer 413 which times the length of the multimedia call and can be used to set an alarm, slide projector 414 which is used to display a presentation of a sequence of one or more images to the meeting participants, and FAX machine 415 which is used to send facsimiles to meeting participants and others. The instrumentalities shown in tool closet 409 are by way of example and any other desired multimedia tools may also be included. It is noted that tool closet 409 may be closed to save screen space on the user's workstation monitor screen. Note that the icons are of realistic real life objects that are or should be well known to the meeting participants. Since, all of the objects are well known as to their nature and use, the meeting participants do not need to know any sophisticated protocols in order to use them. Indeed, the virtual meeting participants use the realistic icons in the same manner as they would their real life counterparts. Additionally, the image icons of the meeting participants are arranged around the table in similar fashion as the participants would be seated in a real life face-to-face meeting. This allows the participants to interact with each other and use the objects in the meeting room based on their already existing knowledge. This, in turn, enhances the ease of use of the graphical user interface of this invention.

Figure 5:
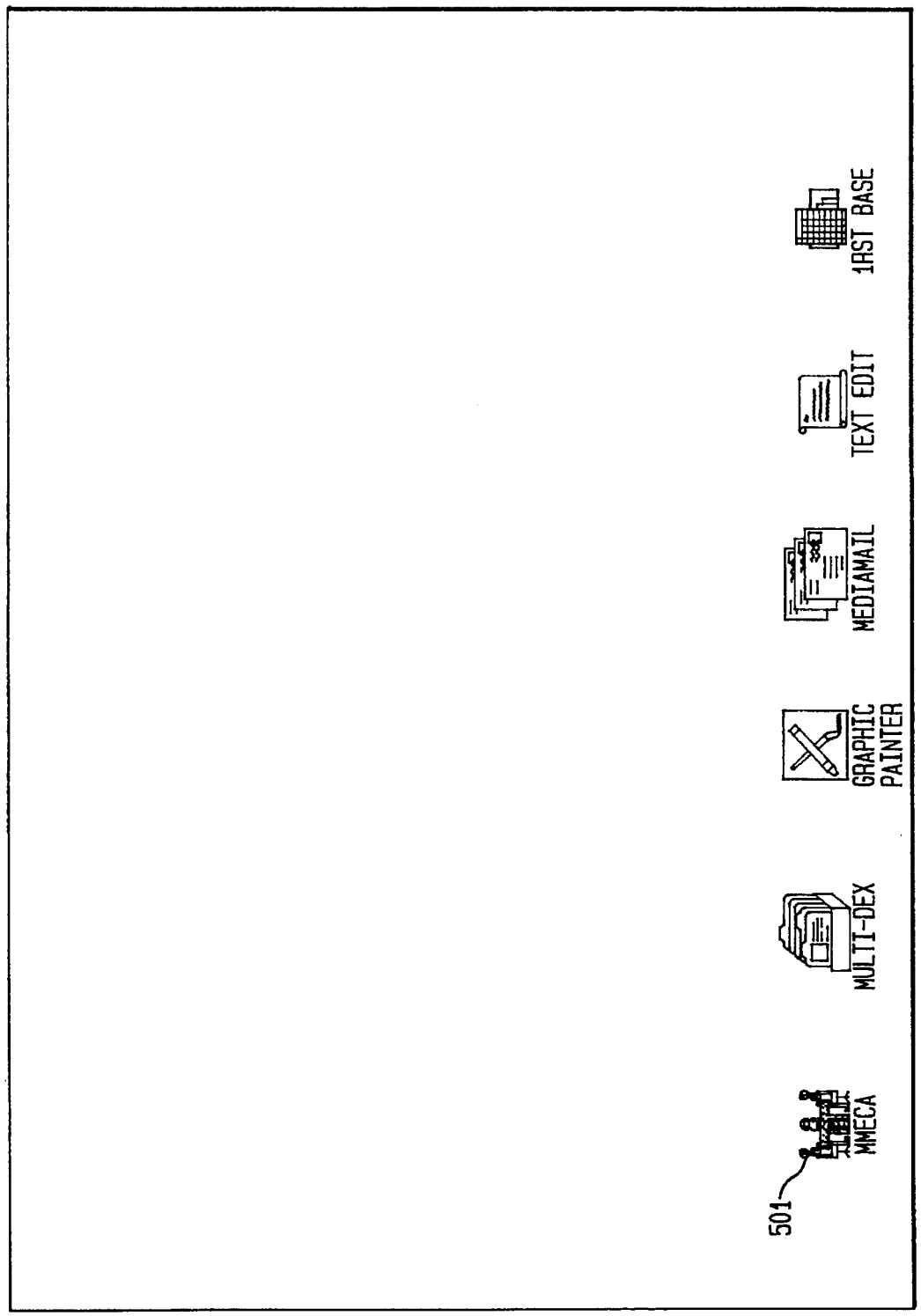
FIG. 5 is a graphical screen representation with the multimedia application minimized.

FIG. 5 is a graphical screen representation with the multimedia application (MMECA) 501 minimized. Also shown are a number of other application programs which have been minimized. Note that the multimedia application of this invention can be implemented on top of a number of known personal computer systems. Examples of such systems programs are the Vistium* personal video system commercially available from AT&T Corp. and the ProShare* personal conferencing system 200 commercially available from Intel Corporation (* note that Vistium is a trademark of AT&T Corp. and that ProShare is a trademark of Intel Corporation). In this example, it is assumed that the personal video system is included as part of the user workstation and provides the network interface 311 (FIG. 3).

Figure 6:
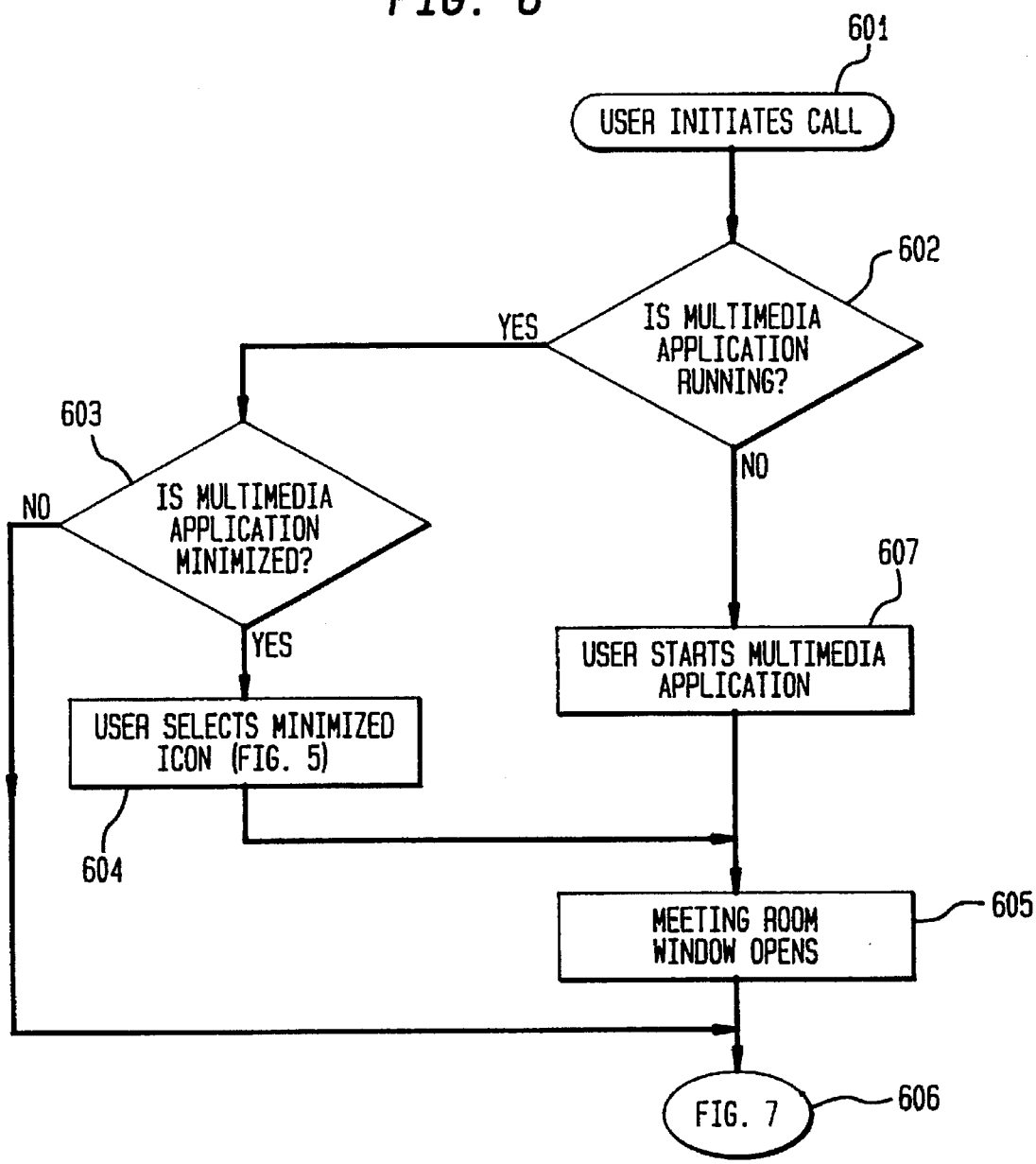
FIG. 6 is a flow chart illustrating the steps a user performs in starting the multimedia application in the initiation of a multimedia telephone call.
Figure 7:
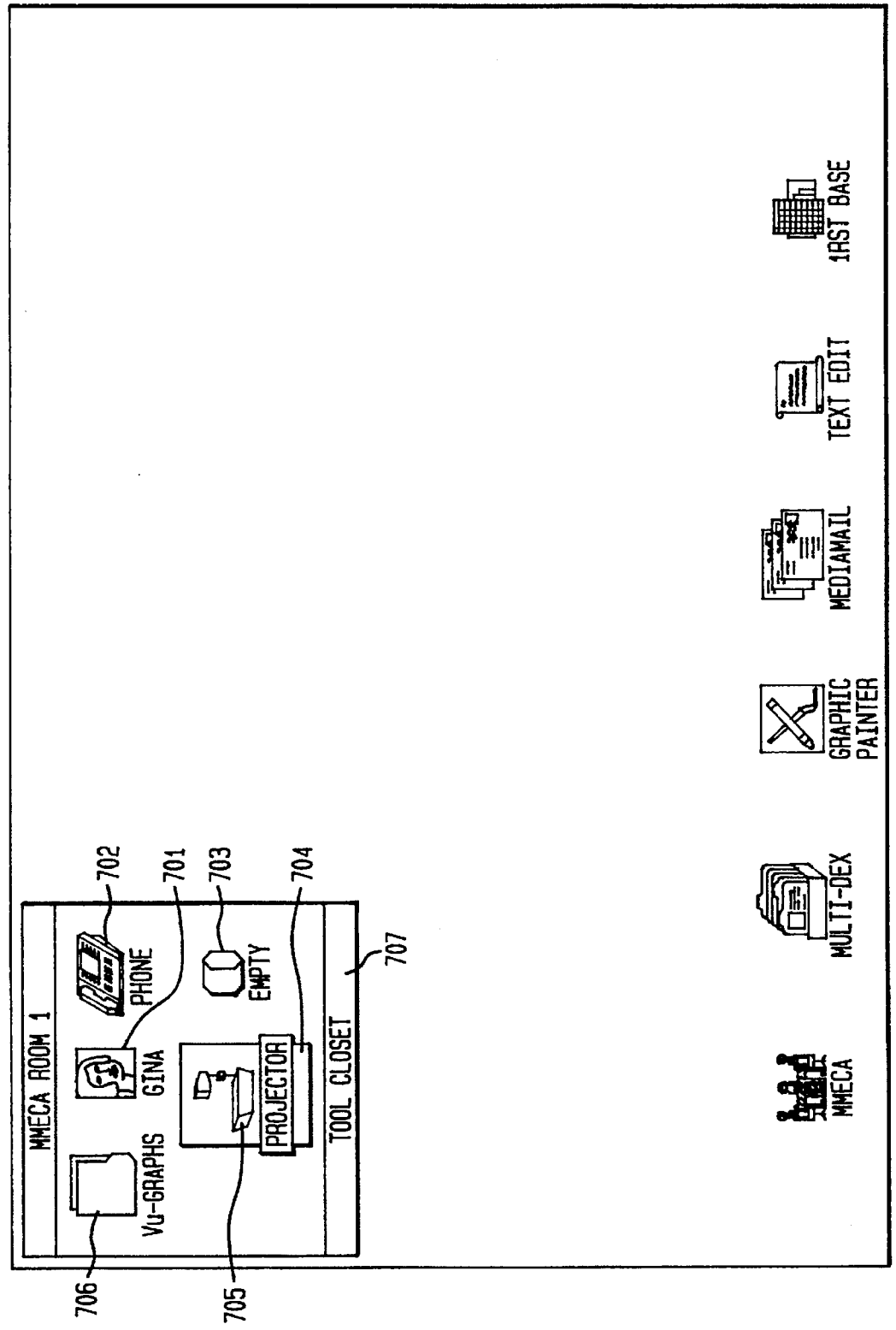
FIG. 7 is a graphical screen representation which is displayed upon a user starting the multimedia application in the initiation of the multimedia telephone call.

FIG. 6 is a flow chart illustrating the steps in utilizing the multimedia application for initiating a multimedia telephone call. In step 601, a user initiates a multimedia call. Then, in step 602, the user determines whether or not the multimedia application is running. If the test result in step 602 is YES, in step 603, the user determines whether the multimedia application is minimized. If the test result in step 603 is YES, the user selects the minimized multimedia application icon 501, as shown in FIG. 5. Thereafter, control is transferred to step 605 in which the meeting room window opens as shown in the screen of FIG. 7. Returning to step 603, if the test result is NO, the multimedia application is not minimized and the meeting room window is already open, as shown in the screen of FIG. 7. Returning to step 602, if the test result is NO, in step 607, the user starts the multimedia application in a manner consistent with the operating system employed in the user workstation. Thereafter, control is passed to step 605 where the meeting room window opens and is displayed, as shown in the screen of FIG. 7.

FIG. 7. as indicated above, is a graphical screen representation displayed upon a user starting the multimedia application upon initiating a multimedia call. In the example shown in FIG. 7, image icon 701 is of the multimedia call originator. Also shown is telephone 702 which may be used to originate the multimedia call, empty chair 703 which is available for an additional meeting participant to join the meeting in the multimedia call, table 704 which is used to share objects among the participants, projector 705 which is used to share images among the meeting participants, view graph folder 706, which contains the images to be shared among the meeting participants, and tool closet 707, which is closed. Again, note that the icons are of realistic real life objects which are well known to the meeting participants.

Figure 8:
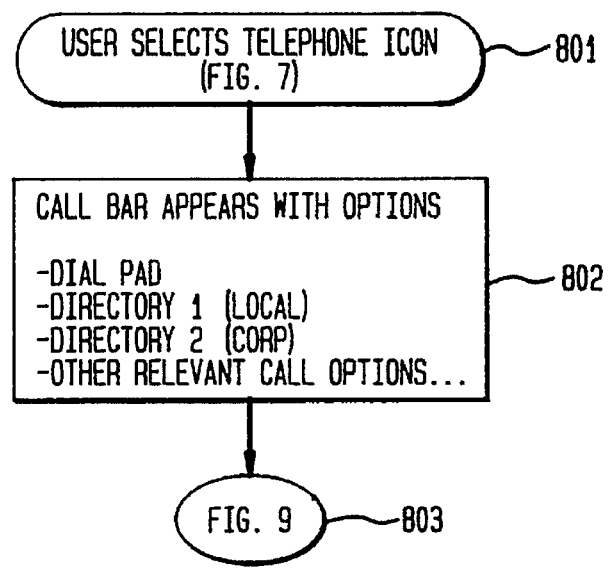
FIG. 8 is a flow chart illustrating the steps that the user would perform in selecting a telephone to initiate a multimedia call.
Figure 9:
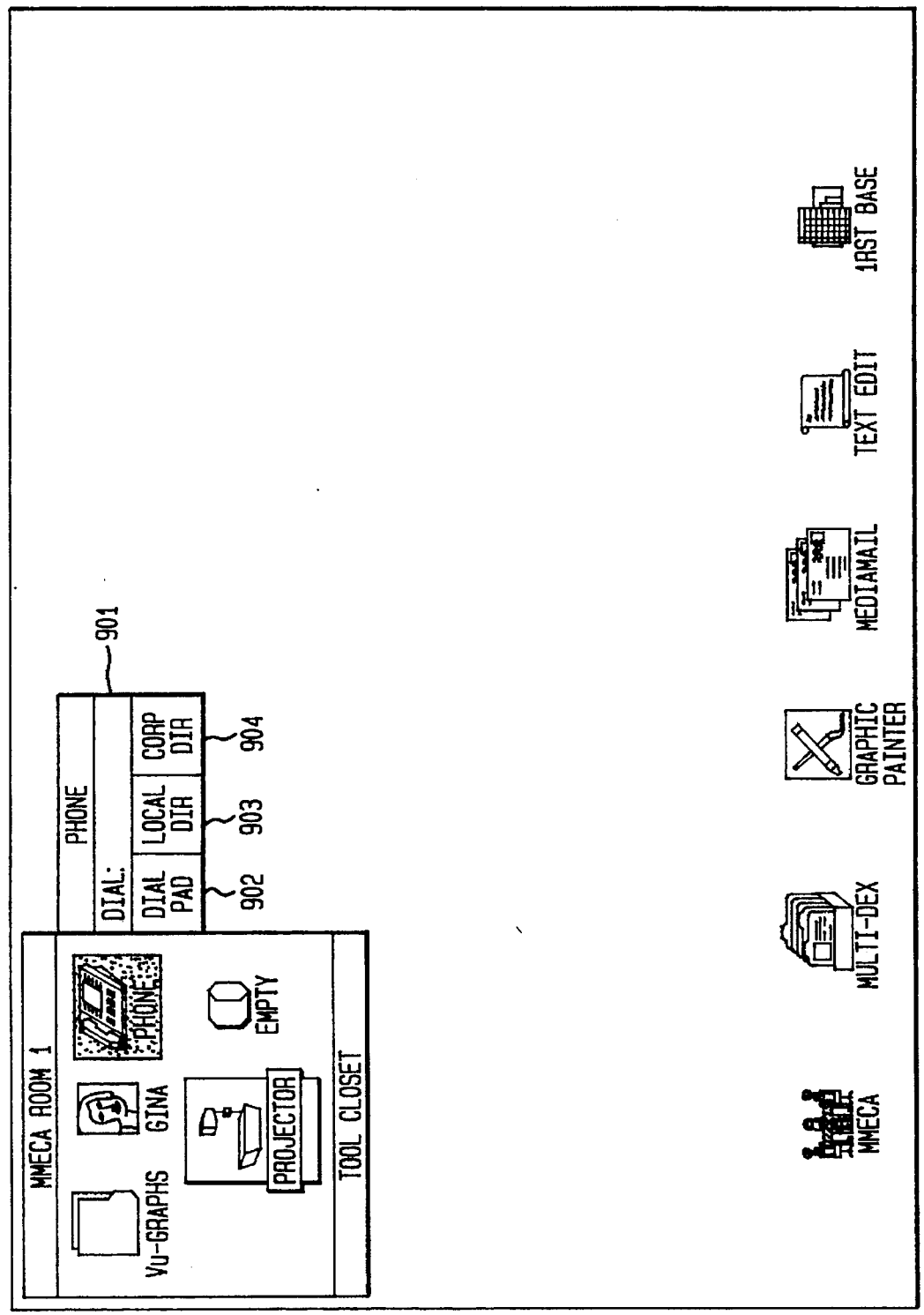
FIG. 9 is a graphical screen representation of the call bar that appears when the telephone is selected to initiate the multimedia call.

FIG. 8 is a flow chart illustrating the steps taken in the user selecting telephone 702 (FIG. 7) to initiate a multimedia call. Thus, in step 801, the user selects the realistic telephone icon 702. This causes a call bar to appear on the screen adjacent to telephone 702, as shown in the screen of FIG. 9. The call bar includes a field 901 for the user to enter a number to be called directly from the workstation keyboard, and a dial pad button 902, which when selected will display a dial pad for entering the number. Additionally, in this example, option buttons 903 and 904 are provided to select either a local on-line telephone directory or a corporate telephone directory located on the network. It should be noted that the directories associated with option buttons 903 and 904 are just examples of such directories that can be utilized for selecting the number to be called.

Figure 10:
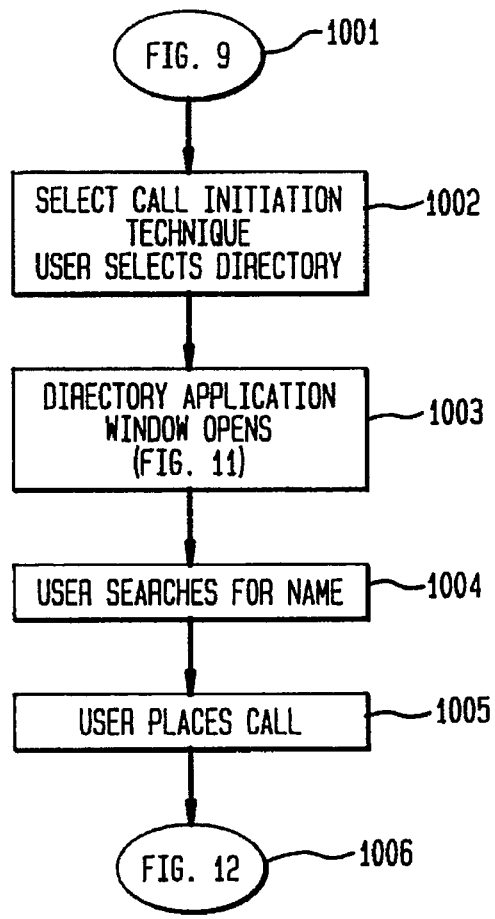
FIG. 10 is a flow chart illustrating the steps in placing a multimedia call from the directory shown in FIG. 11.
Figure 11:
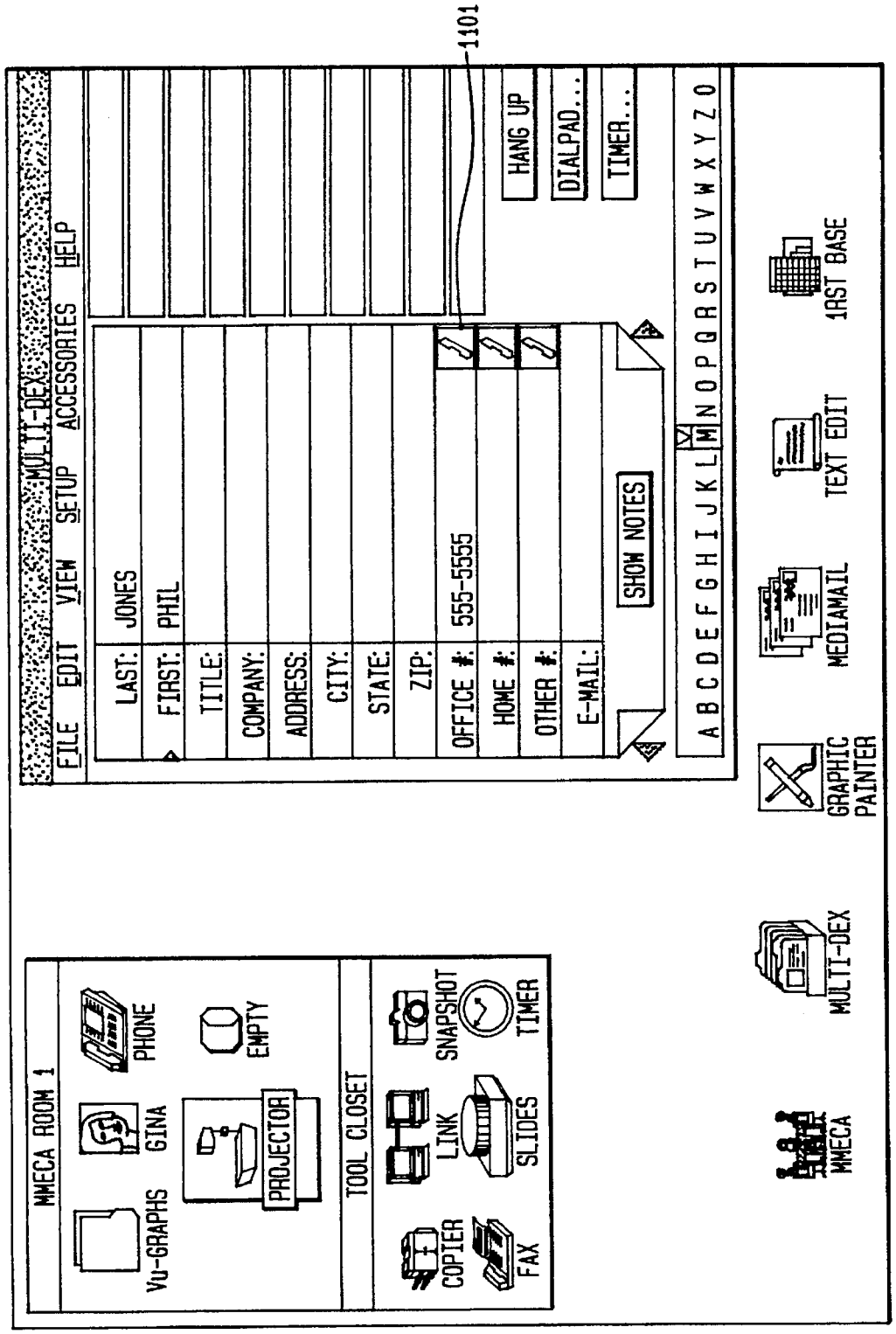
FIG. 11 is a graphical screen representation of a directory.
Figure 12:
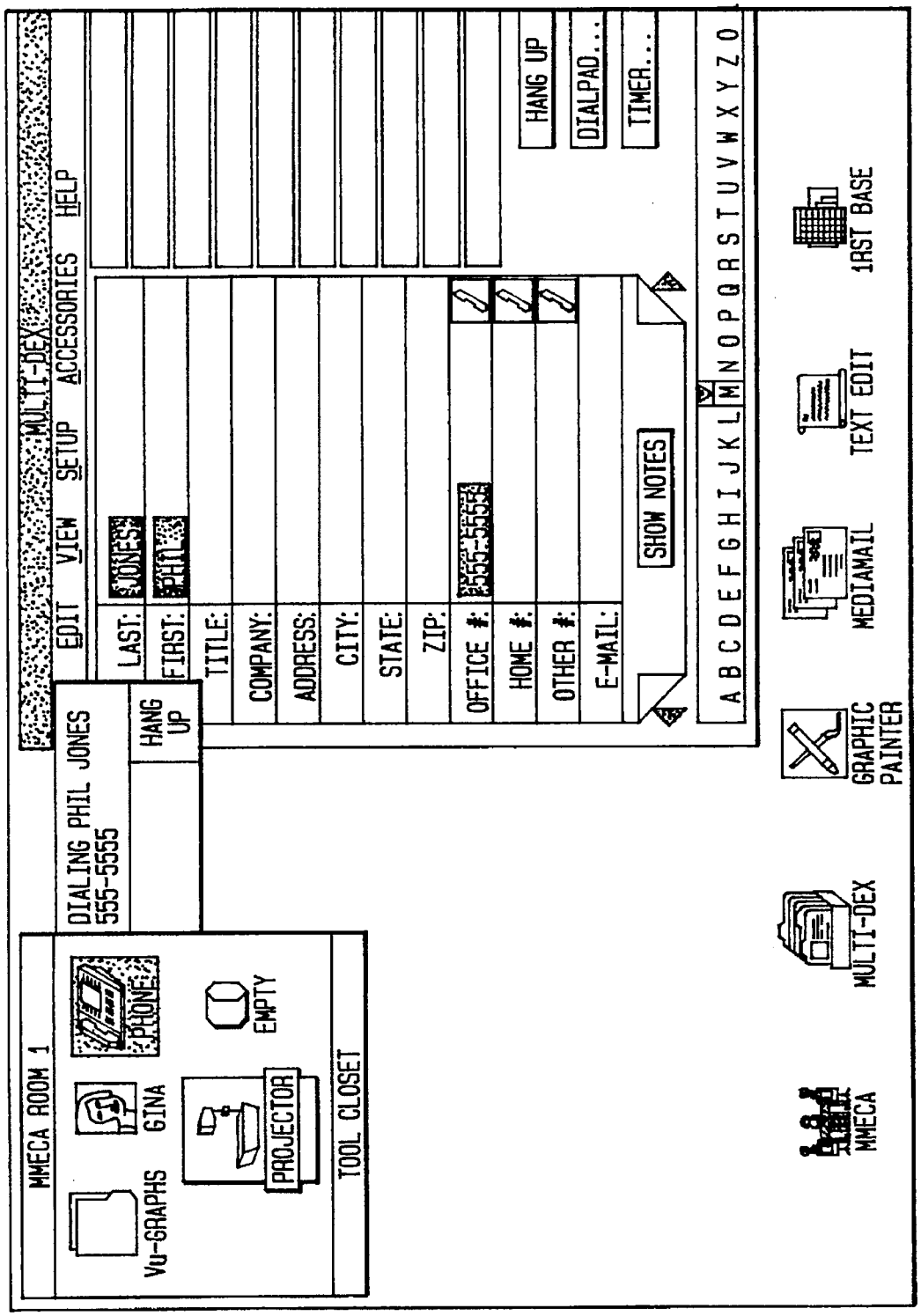
FIG. 12 is a graphical screen representation of a multimedia call initiated from an entry in the directory.

FIG. 10 is a flow chart illustrating the steps the user takes in placing a call from a multimedia directory. Thus, the process is initiated via step 1001 from the screen shown in FIG. 9. Then, in step 1002, the user selects the call initiation technique which, in this example, is the directory. This causes the directory application window to open via step 1003 and is shown in the screen of FIG. 11. The directory, shown in the window of FIG. 11, is just one example of numerous such directories that may be employed. Then, in step 1004, the user searches for the name of the desired prospective participant to be called in the multimedia call. This is realized by the user browsing through the directory. Upon the user locating the name of the desired prospective meeting participant, he or she places the multimedia call via step 1005. The call placement may be effected by any desired method, one of which is to select call button 1101, as shown adjacent to the prospective participant's telephone number in FIG. 11. The placement of the call by the user in step 1005 causes the screen as shown in FIG. 12 to be displayed via step 1006. As shown in FIG. 12, the call bar adjacent to the telephone displays the name and telephone number of the prospective meeting participant that was dialed.

Figure 13:
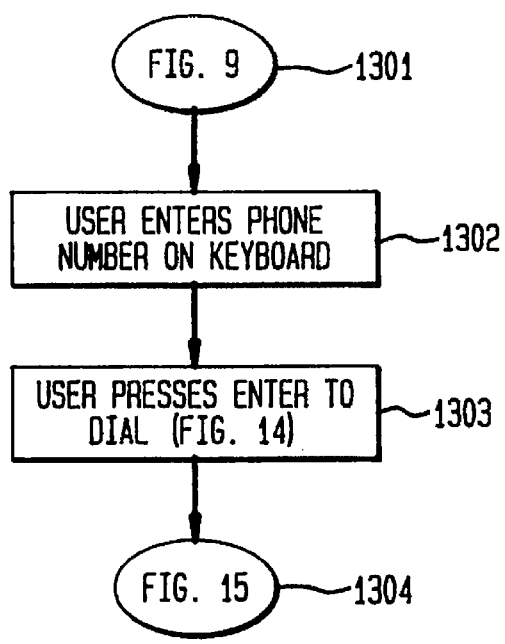
FIG. 13 is a flow chart illustrating the steps taken in effecting a multimedia call directly from the call bar.
Figure 14:
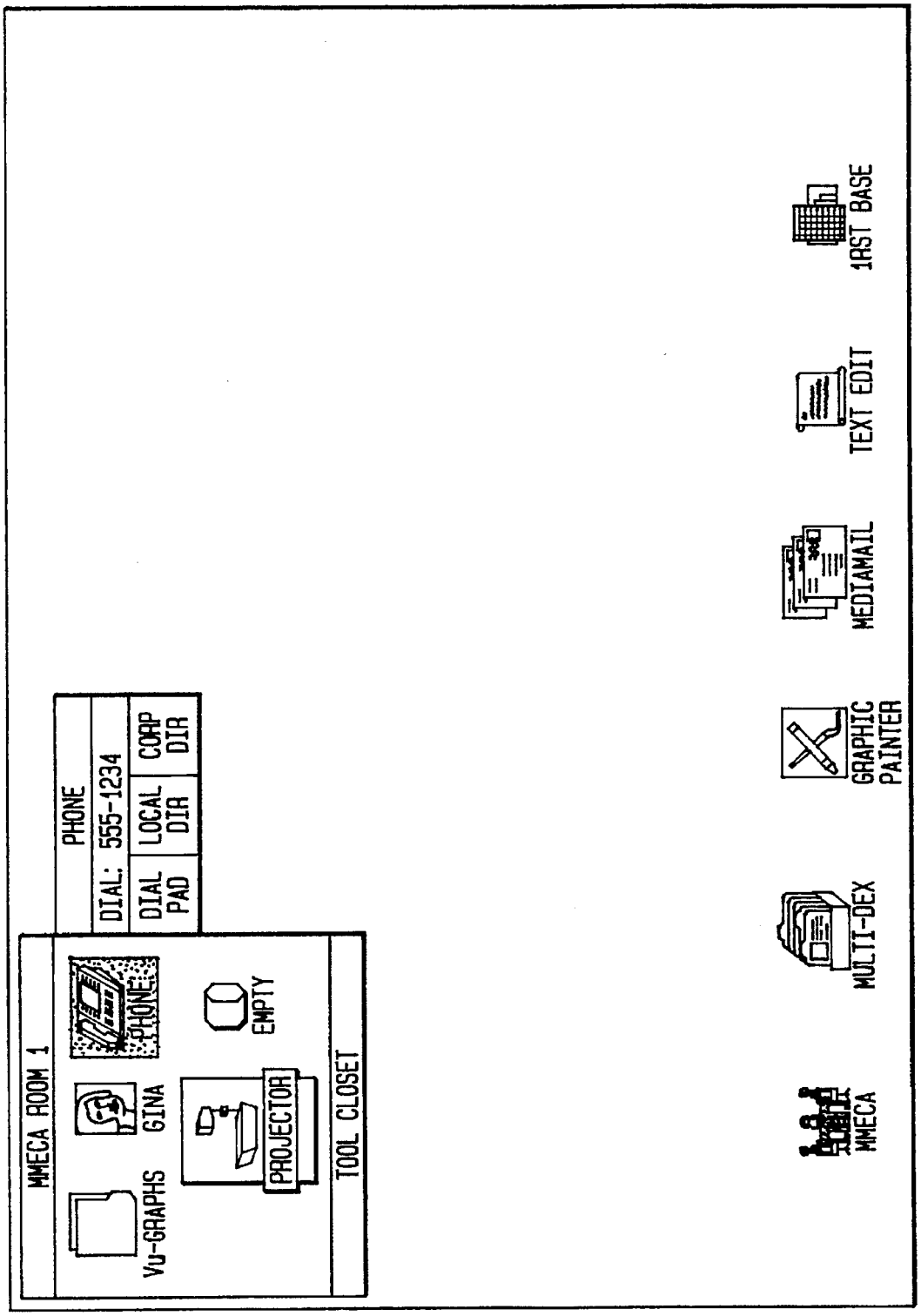
FIG. 14 is a graphical screen representation illustrating a phone number being entered directly from the keyboard of the user workstation.

FIG. 13 is a flow chart illustrating the steps the user takes in effecting a multimedia call directly from the call bar, shown in FIG. 9. This process is initiated in step 1301 from the screen shown in FIG. 9. Then, in step 1302, the user enters the desired participant's telephone number on the local workstation keyboard. This causes the telephone number being dialed to appear in the call bar, as shown in the screen of FIG. 14. Then, in step 1303, the user, in this example, presses enter on the keyboard to cause the displayed number to be dialed, which also causes the call bar to display that the number is being dialed, as shown in the screen of FIG. 15.

Figure 16:
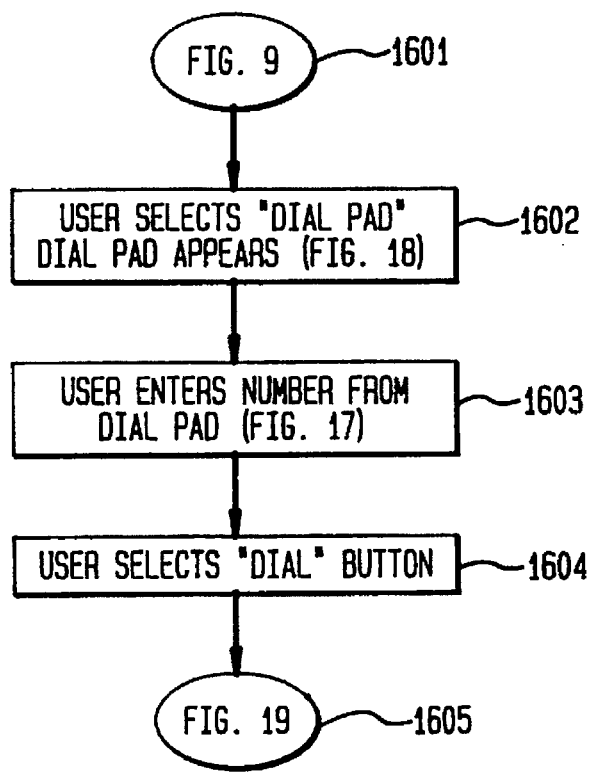
FIG. 16 is a flow chart illustrating the steps taken in effecting a multimedia call from a dial pad.
Figure 17:
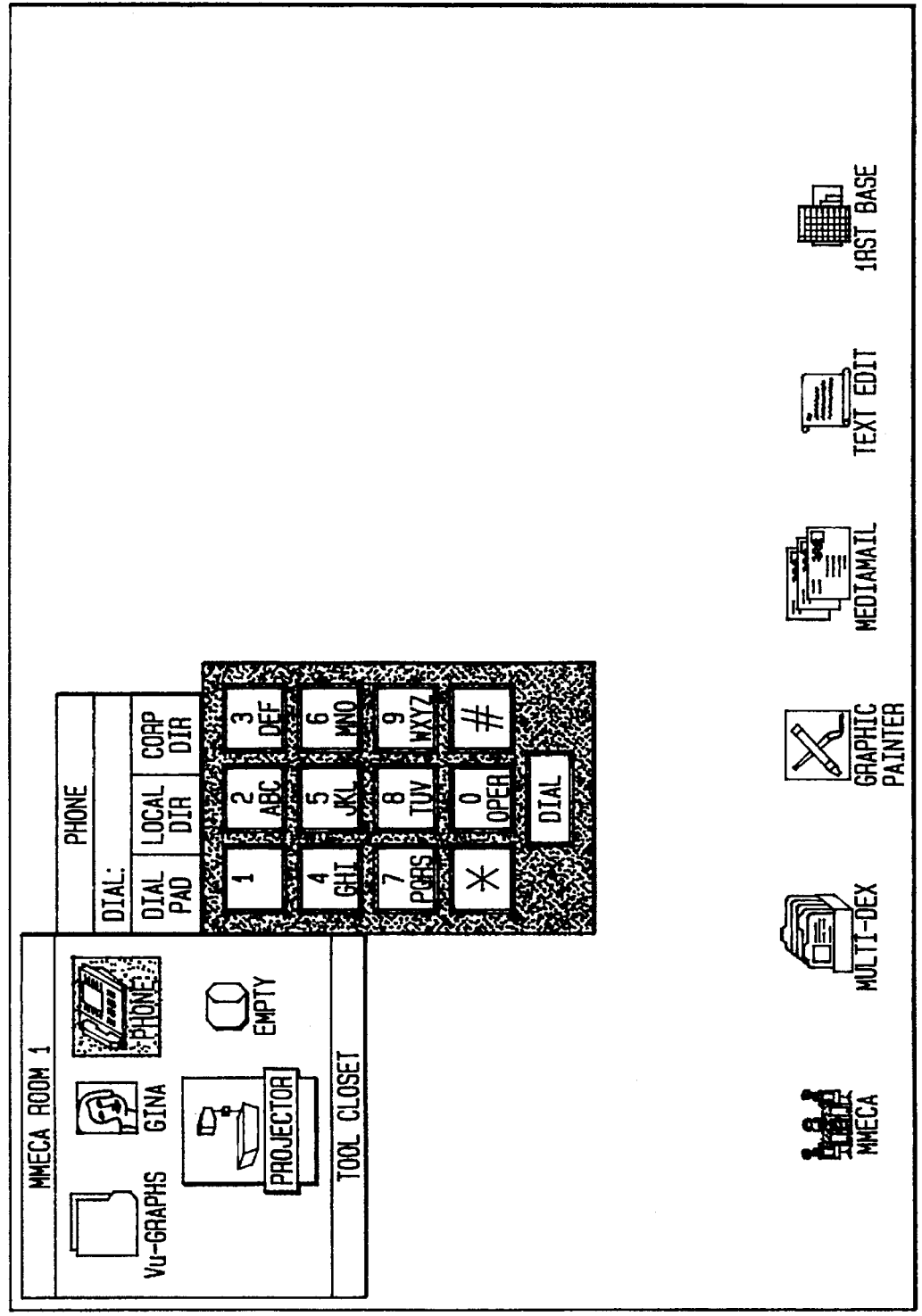
FIG. 17 is a graphical screen representation illustrating the appearance of the dial pad below the call bar.
Figure 18:
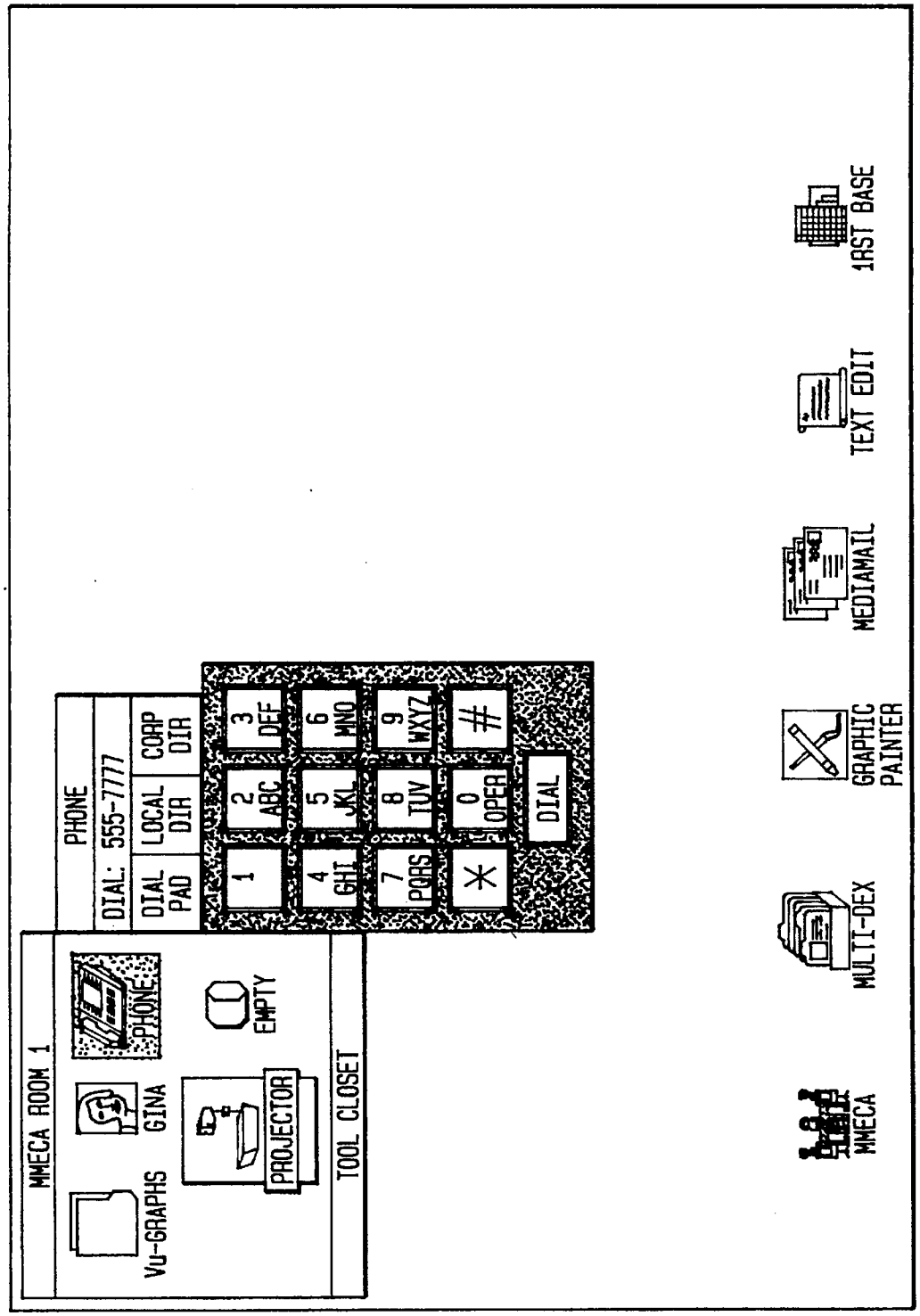
FIG. 18 is a graphical screen representation illustrating a phone number entered on the dial pad.

FIG. 16 is a flow chart illustrating the steps a user would take in effecting a multimedia call from the dial pad. This process is initiated in step 1601 from the screen of FIG. 9. In this instance, the user selects the dial pad option 902 from the call bar via step 1602, which causes the dial pad to appear on the screen, as shown in the screen of FIG. 17. Then, in step 1603, the user enters the desired participant's telephone number from the dial pad using a pointing device such as a mouse. This, in turn, causes the number entered to appear in the call bar, as shown in the screen of FIG. 18. Then, in step 1604, the user selects the dial button from the dial pad, which causes the telephone number to be dialed. This, causes the call bar screen to display that the number is being dialed, as shown in the screen of FIG. 19.

Figure 15:
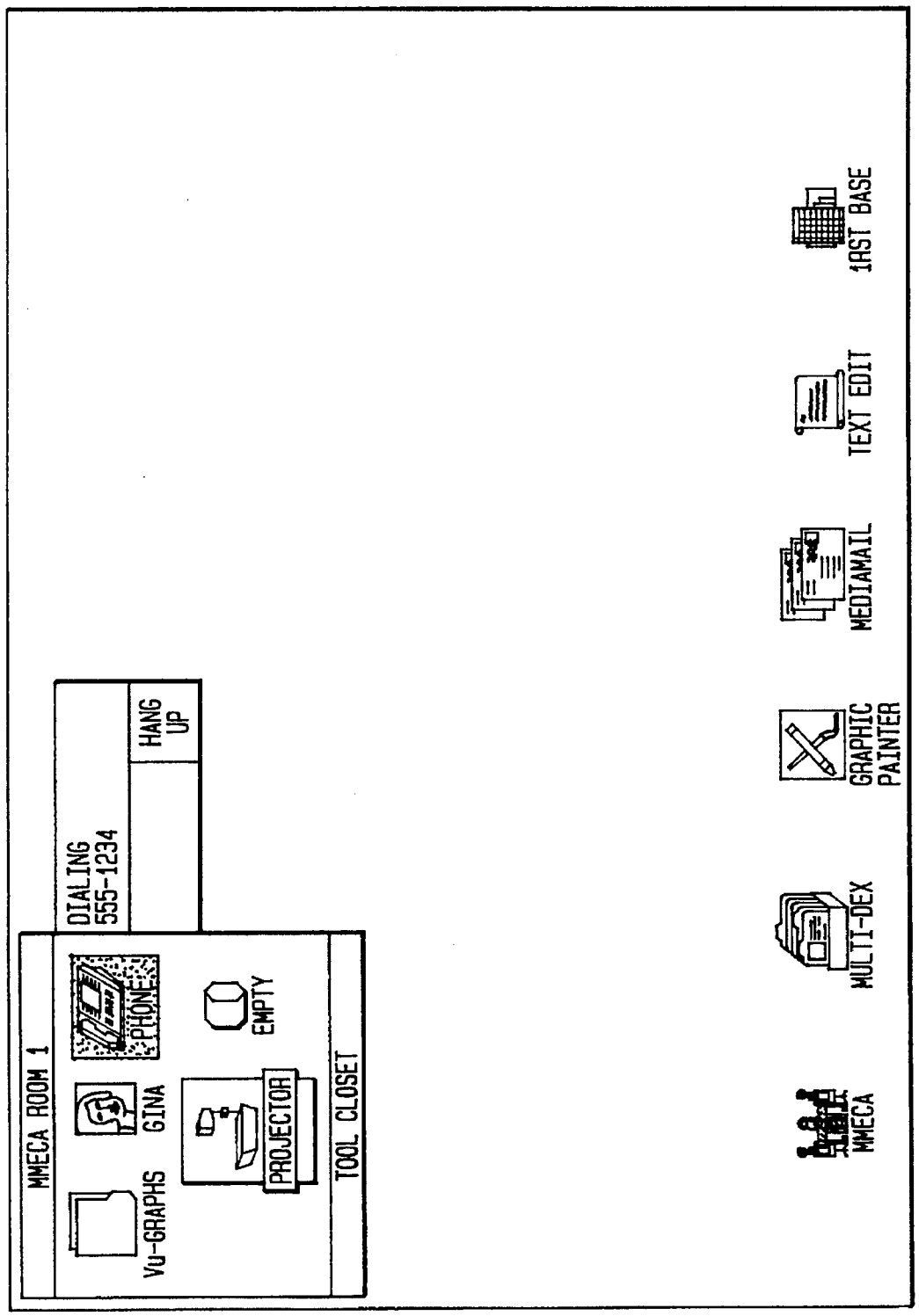
FIG. 15 is a graphical screen representation illustrating ringing at a remote participant's phone number that is being displayed.
Figure 19:
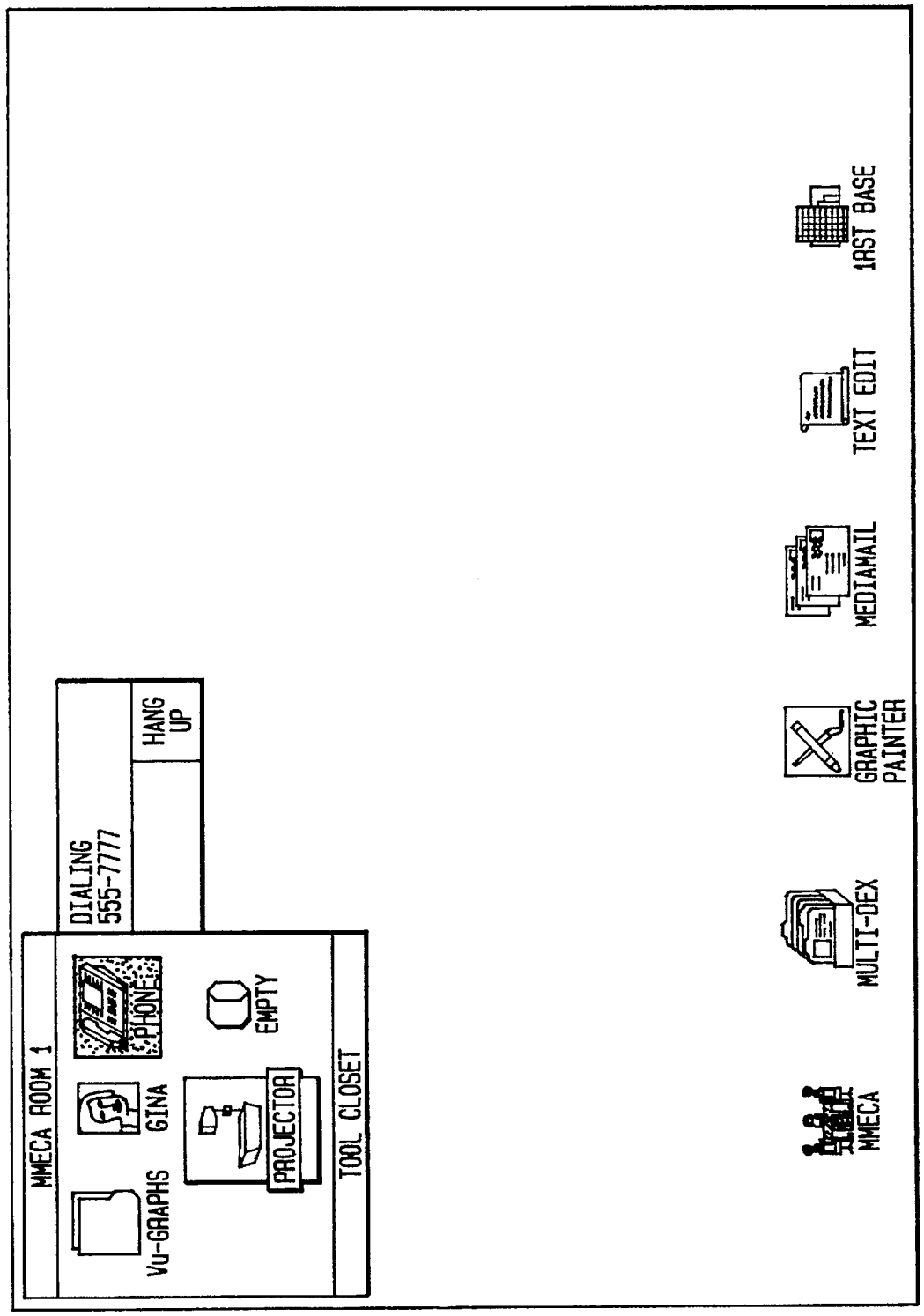
FIG. 19 is a graphical screen representation illustrating ringing at a remote participant's phone number that is being displayed.
Figure 21:
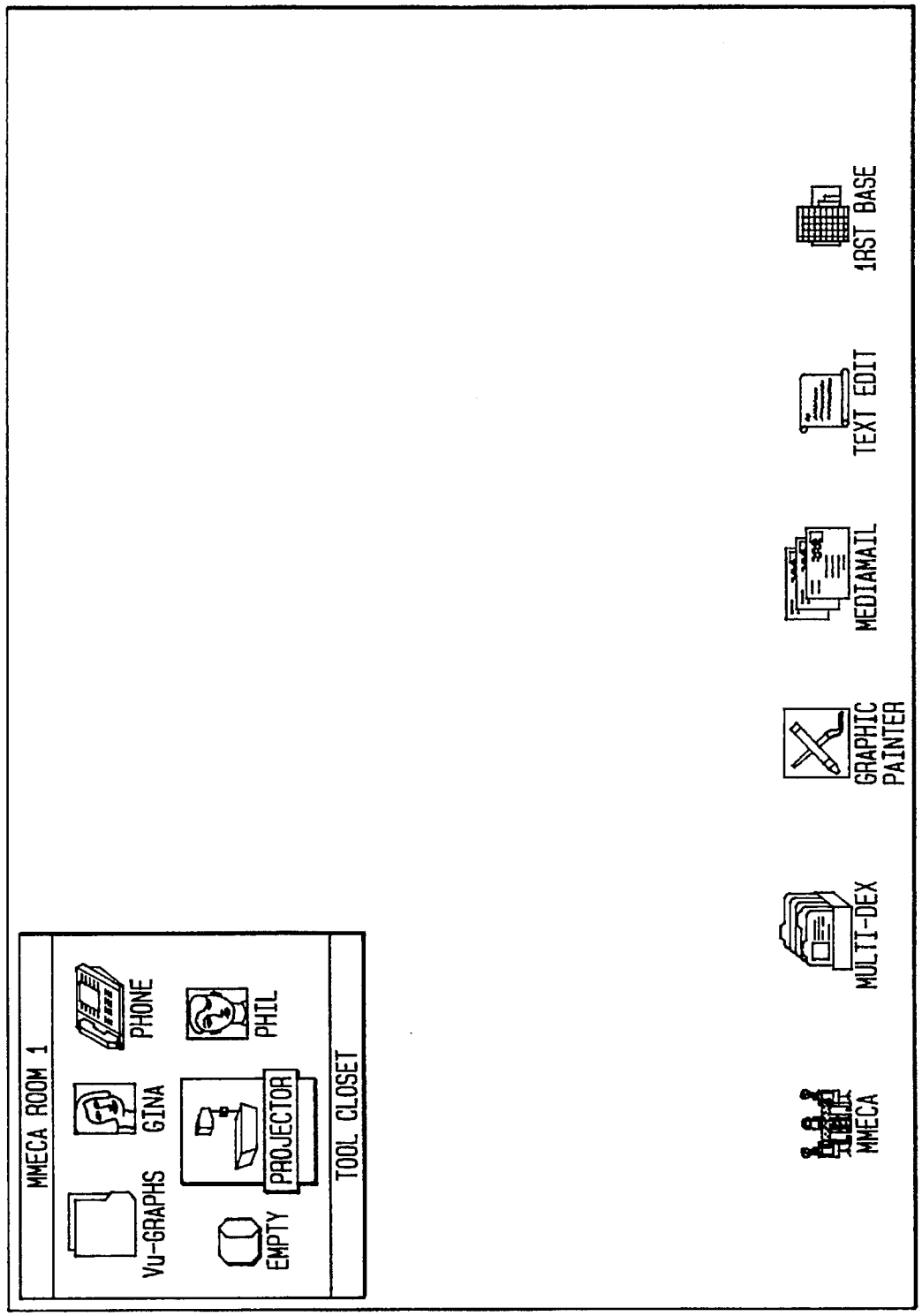
FIG. 21 is a graphical screen representation illustrating the meeting upon a remote participant answering the call.

FIG. 20 is a flow chart illustrating the steps which are taken once the multimedia call is placed, as displayed in either of the screens in FIGS. 12, 15 or 19, as initiated via step 2001. Then, as shown in either of FIGS. 12, 15 or 19, and as indicated in step 2002, the call has been placed and the dialed number and the name of the called participant, if available, appear in the call bar, as well as, a hang up option. Then, step 2003 tests to determine if the call has been answered. If the test result in step 2003 is NO, in step 2004, the user selects the hang up option from the call bar. Thereafter, the call bar is removed and the screen appears, as shown in FIG. 7. Returning to step 2003, if the test result is YES, step 2006 causes the call to begin with audio only, causes the call bar to be removed from the screen, and causes an icon of the called participant to be placed in the meeting room on a chair, as shown in the screen of FIG. 21. It is noted that if the participant's image bit map is not available the generic image icon 405 will appear instead.

Figure 24:
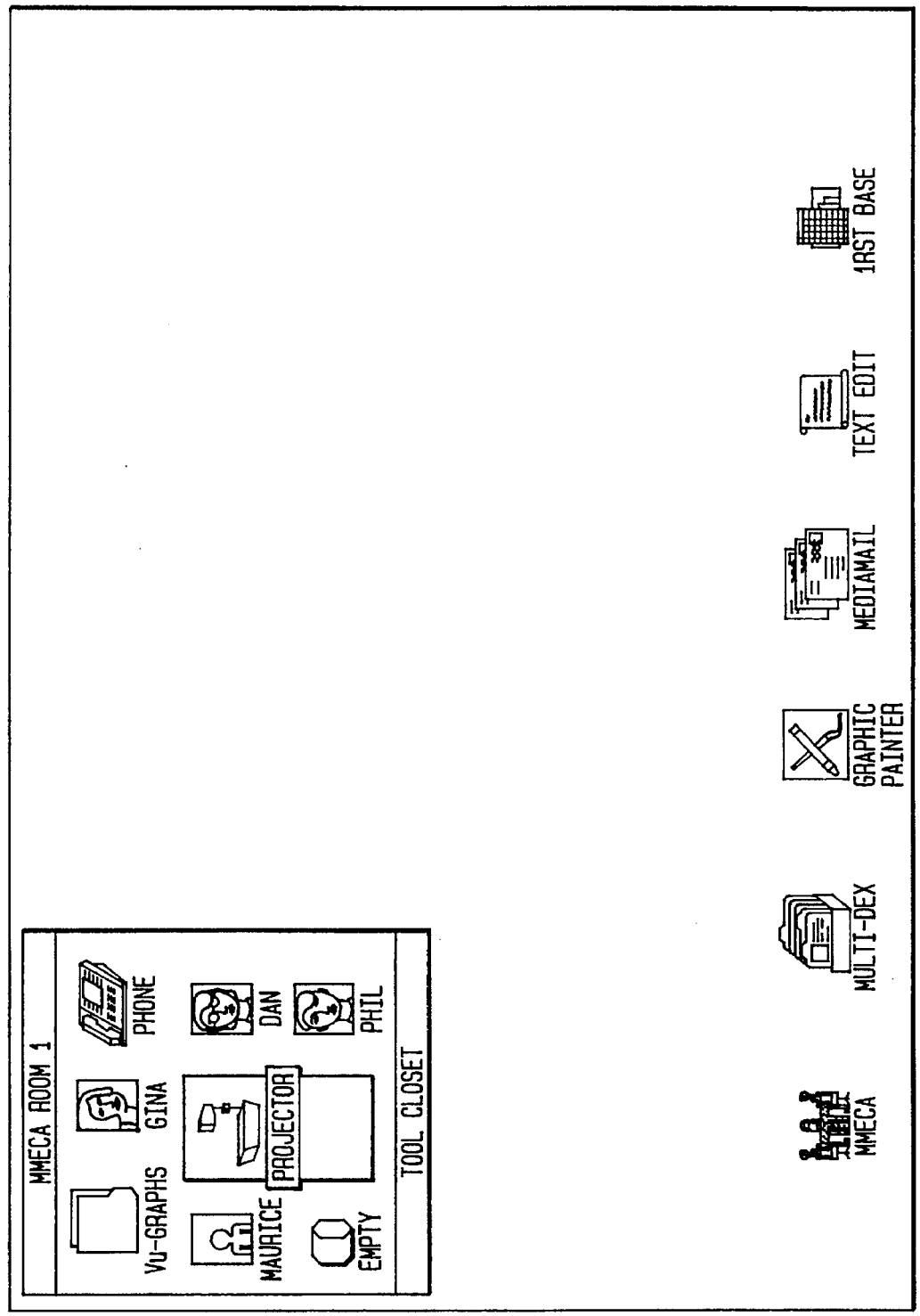
FIG. 24 is a graphical screen representation illustrating the meeting room upon the called party answering the incoming call.

FIG. 22 is a flow chart illustrating the steps which are effected upon receipt of an incoming multimedia call at a prospective meeting participant's workstation. The process is entered with the incoming call via step 2201. Thereafter, step 2202 tests to determine if the multimedia application is running at the prospective participant's workstation. If the test result in step 2202 is NO, step 2203 causes only the telephone to ring. Then, the only option available to the called participant is to participate in the audio portion of the meeting. Returning to step 2202, if the test result is YES, step 2204 causes audible ringing to occur, the meeting room to appear on the participant's screen and the call bar to appear next to the telephone in a realistic meeting room metaphor, as shown in the screen of FIG. 23. Additionally as shown in the screen of FIG. 23, the name and number of the calling party is displayed in the call bar. Then, in step 2205, the participant selects a desired call bar option. Thereafter step 2206 tests to determine which option has been selected by the participant, namely, ignore, answer or other. If the test result in step 2206 indicates that the ignore option is selected, step 2207 causes the telephone to stop ringing, the realistic meeting room metaphor to be minimized and the call follows whatever call path has been setup by the network (tier example with a PBX the call could be sent to voice mail or to coverage) and the called participant's screen appears as shown in FIG. 5. Returning to step 2206, if the called participant selects other, step 2208 causes the called participant's workstation to perform any system specific action that the participant desires, such as voice mail or the like. Again, returning to step 2206, if the called participant selects answer, step 2209 causes the called participant's workstation to register its capabilities with the communications network middleware, the call bar on the called participant's screen is removed and the screen displays the real life meeting room with icons representing all the current meeting participants including the called participant being placed around the table in a realistic manner as would occur in a real life face-to-face meeting, as shown in the screen of FIG. 24.

Figure 25:
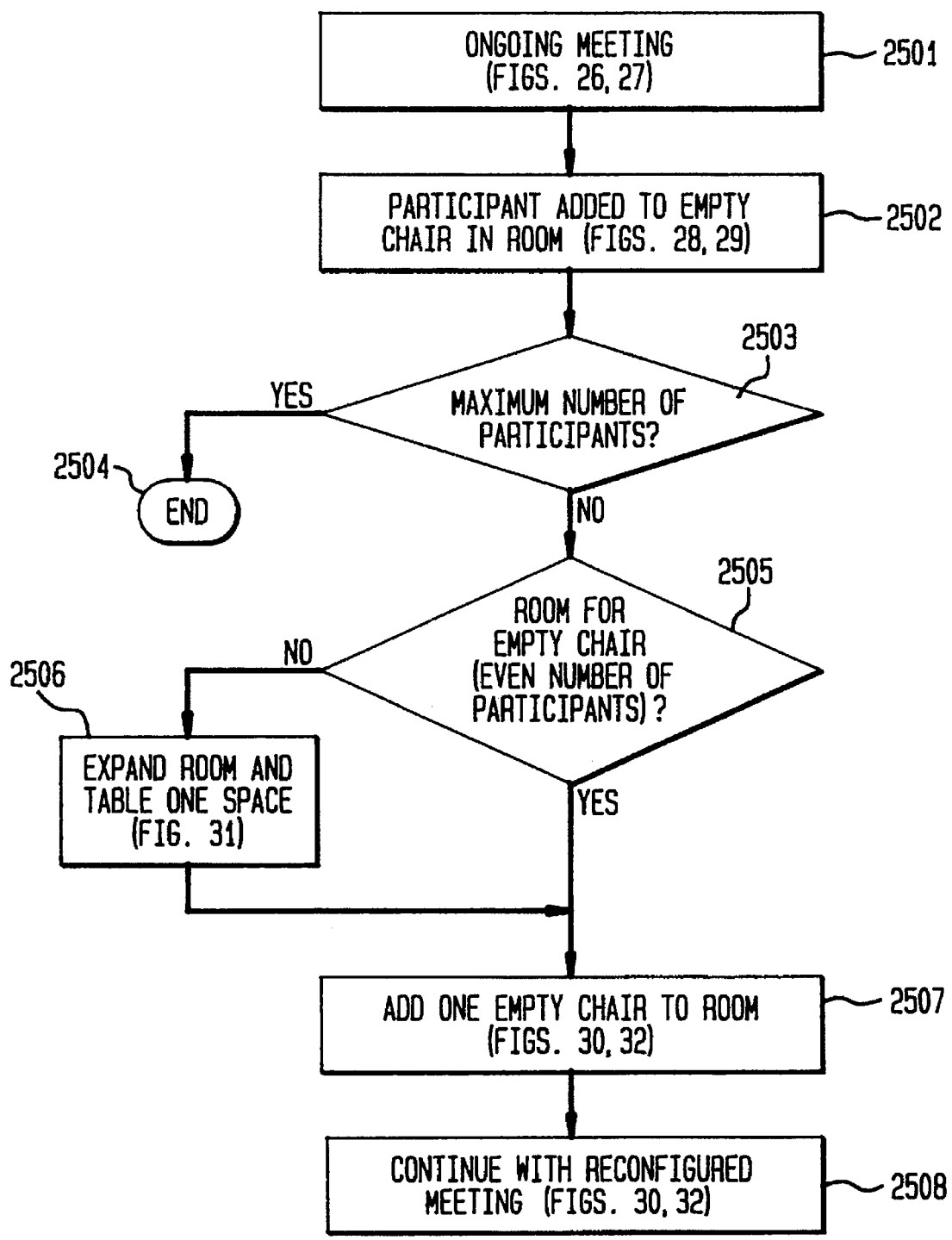
FIG. 25 is a flow chart illustrating the steps taken in adding a participant to an ongoing meeting.
Figure 26:
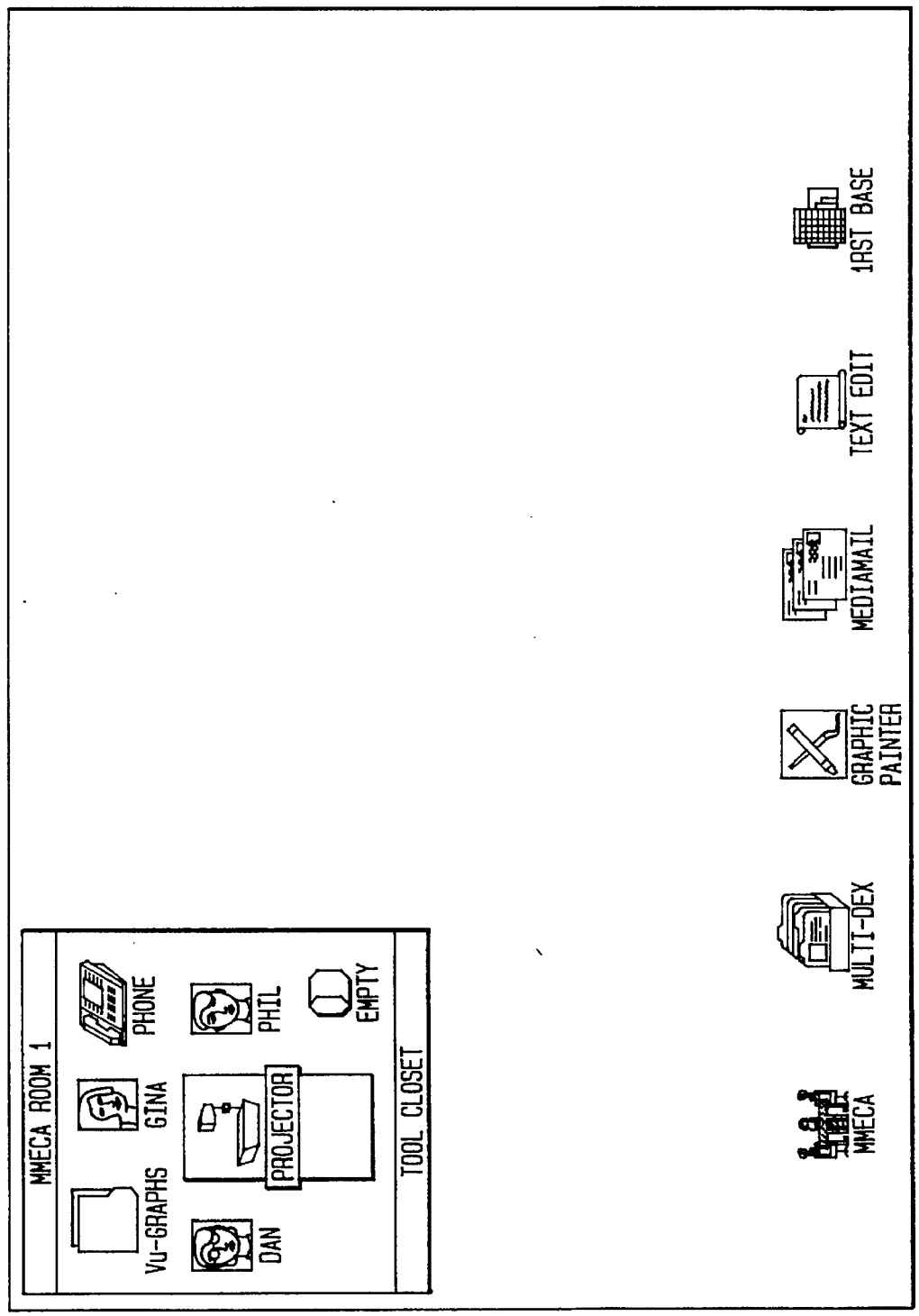
FIG. 26 is a graphical screen representation illustrating an ongoing meeting with three participants.
Figure 27:
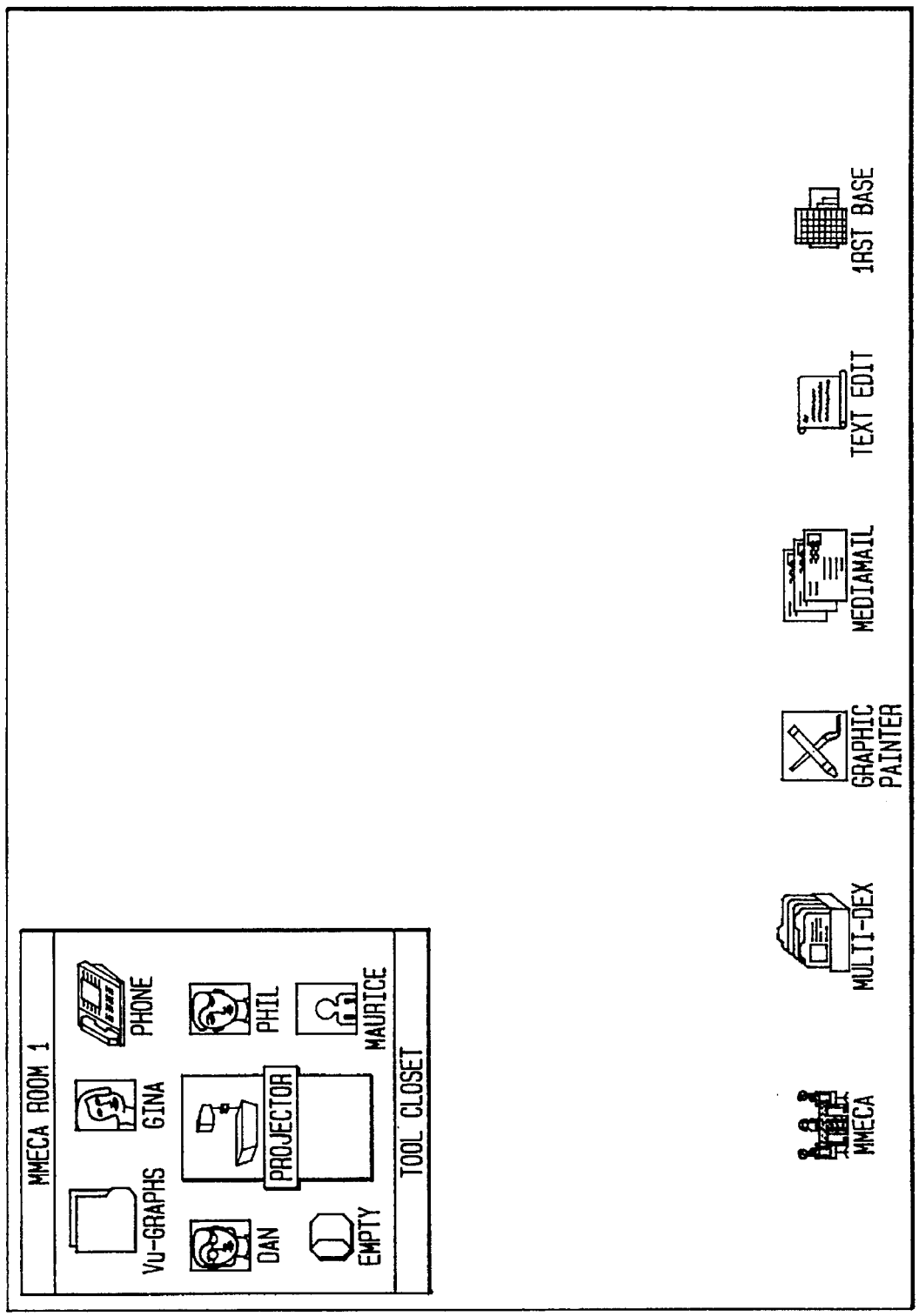
FIG. 27 is a graphical screen representation illustrating an ongoing meeting with four participants.
Figure 28:
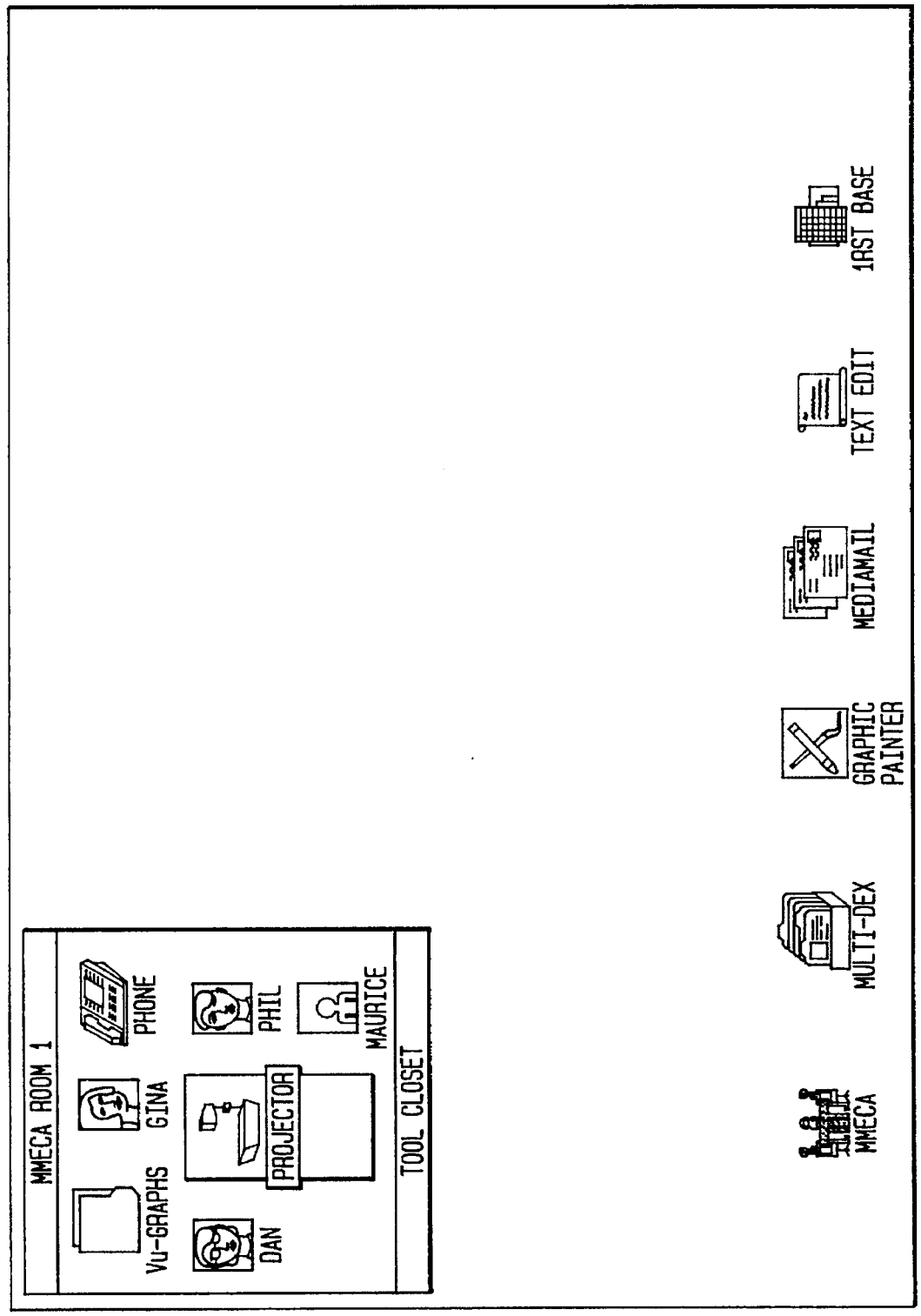
FIG. 28 is a graphical screen representation illustrating the addition of a participant to the meeting shown on the screen of FIG. 26.
Figure 29:
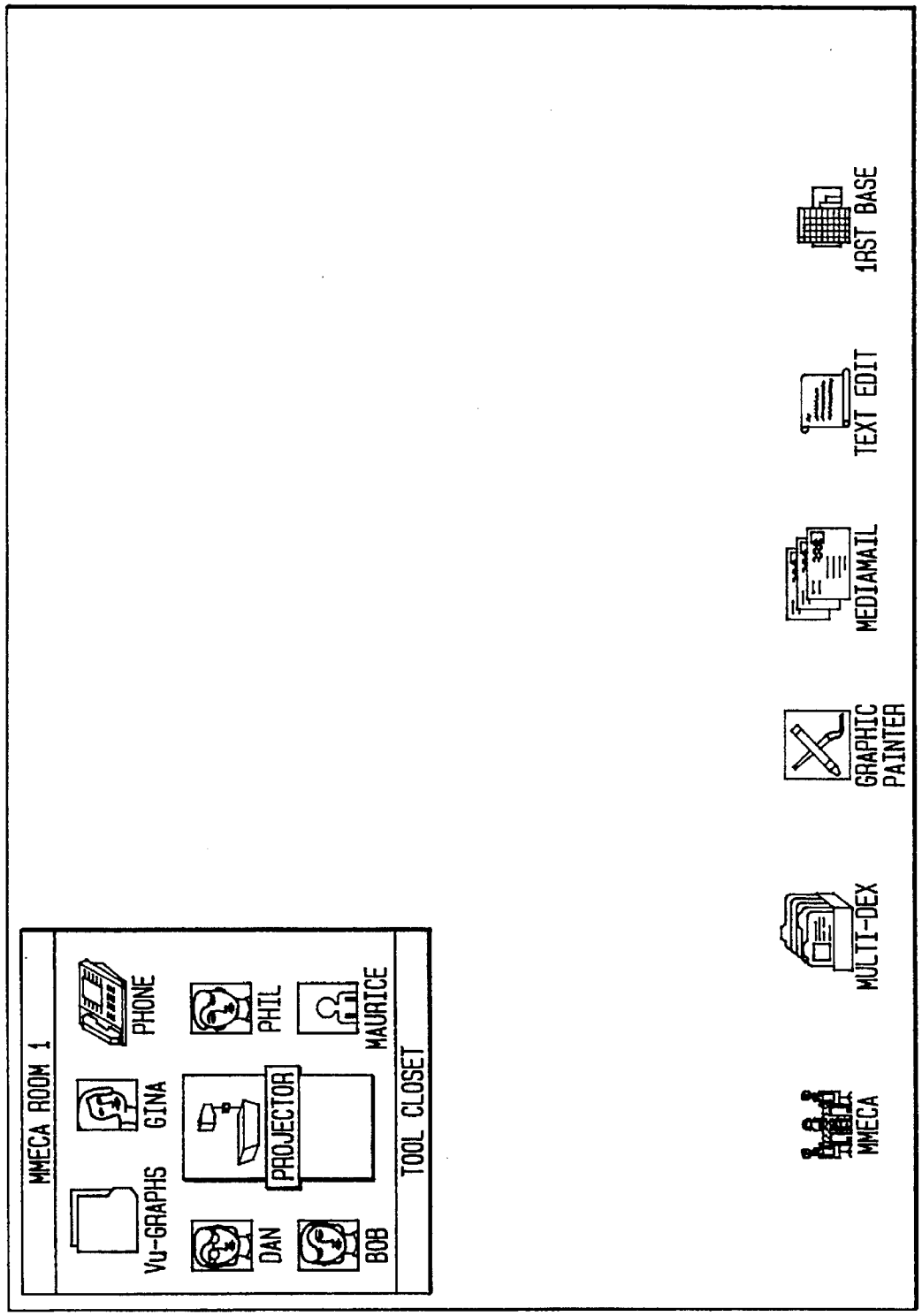
FIG. 29 is a graphical screen representation illustrating the addition of a participant to the meeting shown on the screen of FIG. 27.
Figure 30:
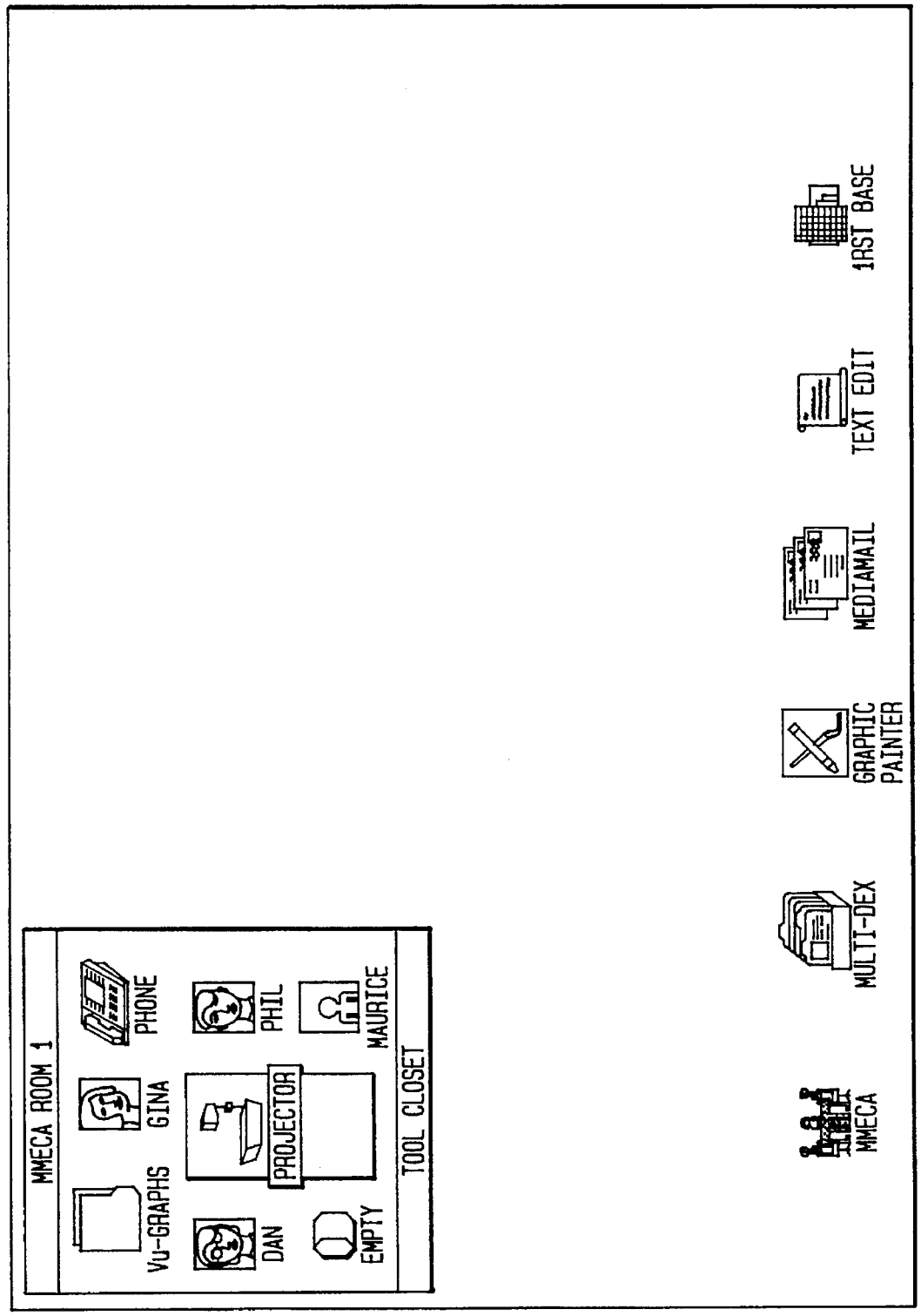
FIG. 30 is a graphical screen representation illustrating the addition of an empty chair to the meeting shown in the screen of FIG. 28.
Figure 31:
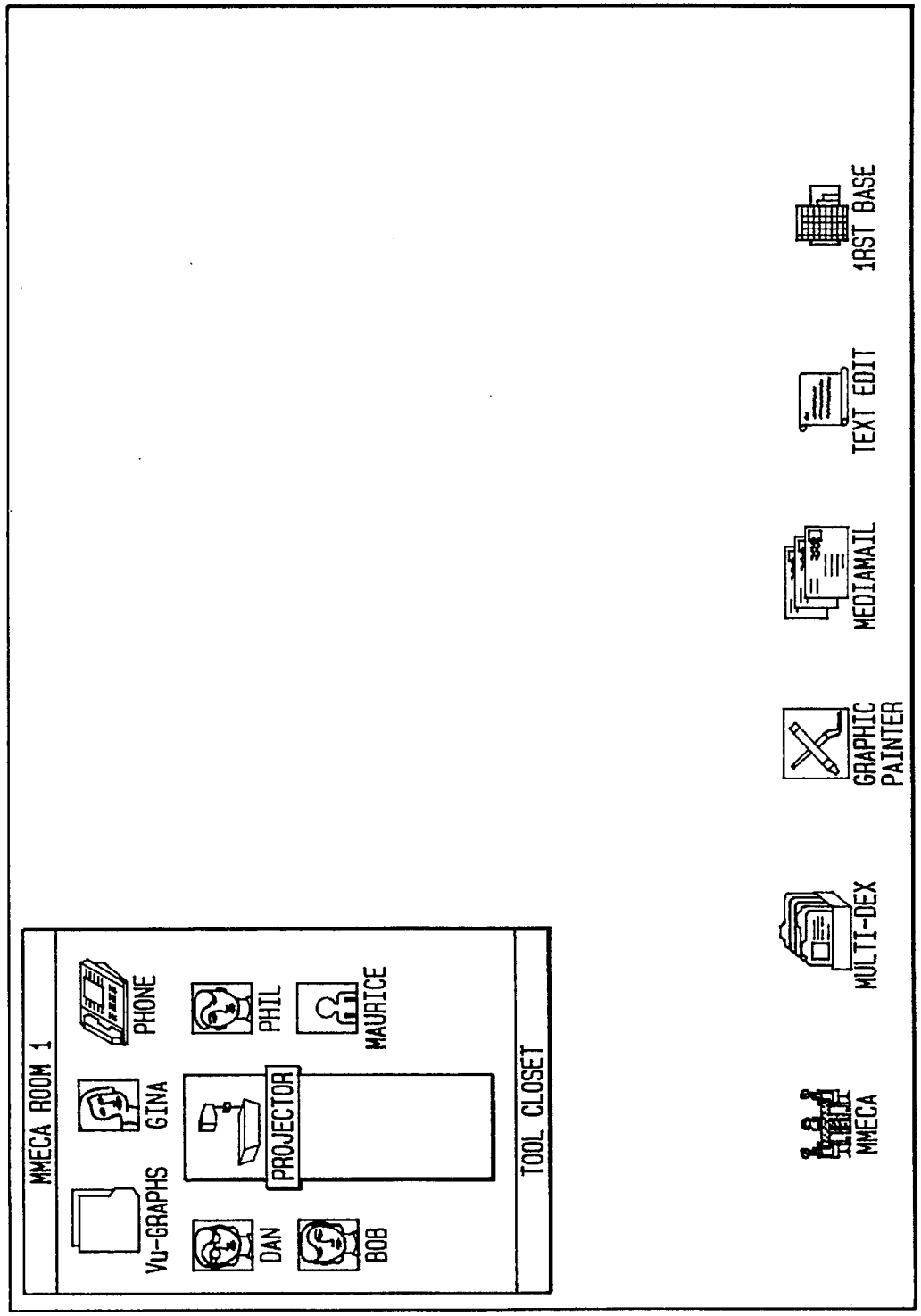
FIG. 31 is a graphical screen representation illustrating expansion of the meeting room from the meeting shown in the screen of FIG. 29.
Figure 32:
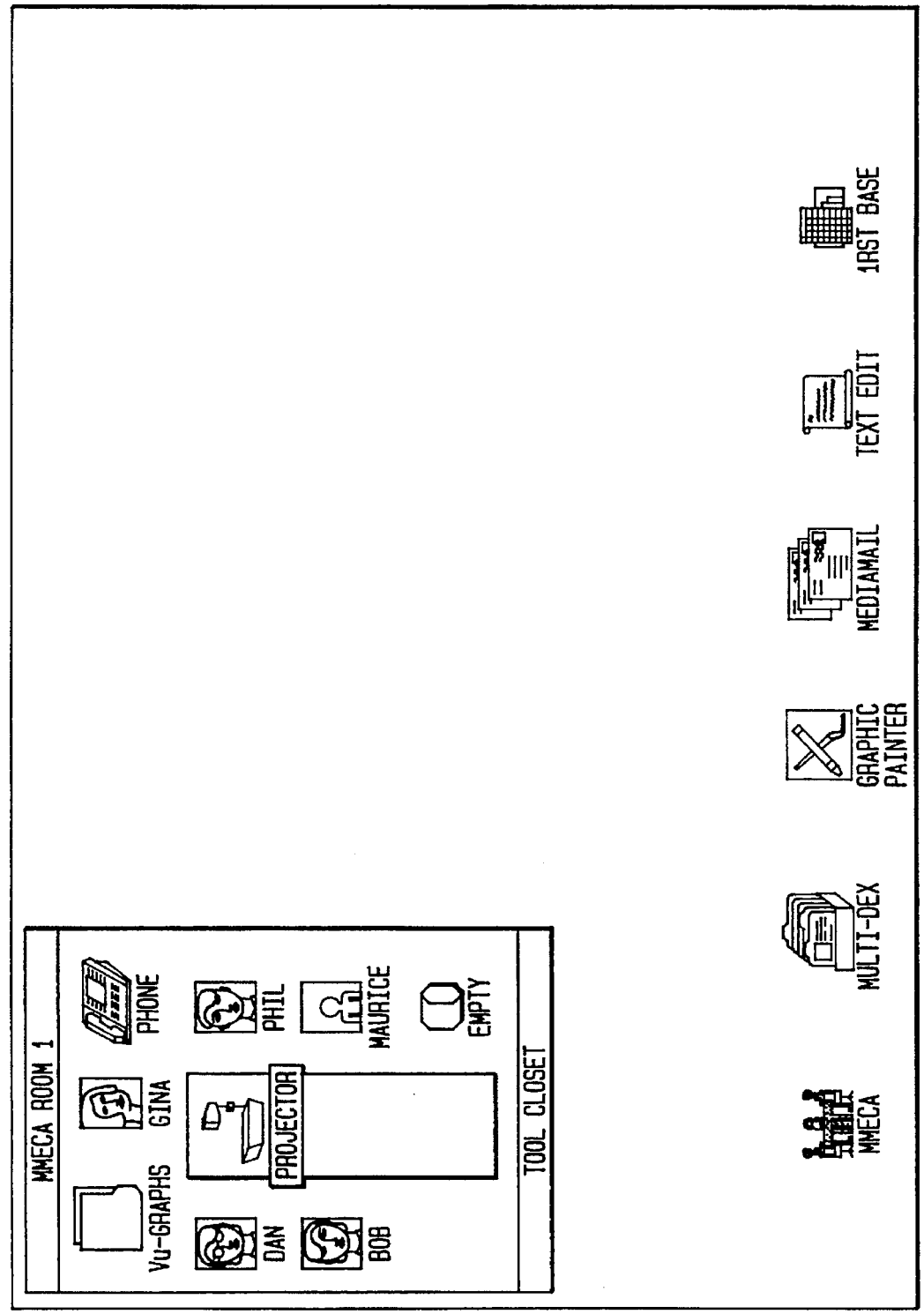
FIG. 32 is a graphical screen representation illustrating the addition of an empty chair to the meeting shown in the screen of FIG. 31.

FIG. 25 is a flow chart illustrating the steps that are taken in the automatic reconfiguration of the room and table when adding a participant to an ongoing virtual meeting. This process of adding a participant is initiated by step 2501 from either a meeting having an odd number of participants as shown in the screen of FIG. 26 or a meeting having an even number of participants as shown in the screen of FIG. 27. Then, step 2502 causes the participant to be added to the empty chair in the meeting room, as shown in the screens of either FIG. 28 or FIG. 29. Once the participant has been added, step 2503 tests to determine if the number of participants has reached a predetermined maximum. If the test result in step 2503 is YES, the process is ended via step 2504, since no more participants can be added. Note that since the maximum number of participants has been reached, the room cannot be expanded nor can an empty chair be added for any additional participants. If the test result in step 2503 is NO, step 2505 tests to determine if there is room to add an empty chair around the meeting table, i.e. whether there is an even number of participants. If the test result in step 2505 is NO, step 2506 causes the virtual meeting room and the table to expand by one participant space, as shown in the screen of FIG. 31. Thereafter, control is passed to step 2507. If the test result in step 2505 is YES, control is passed directly to step 2507, which causes an empty chair to be added to the virtual meeting room. This is shown in the screen of FIG. 30 for a room which did not require expansion and in the screen of FIG. 32 for a room which has been expanded. Thereafter, step 2508 causes the automatically reconfigured meeting(s) to continue.

Figure 33:
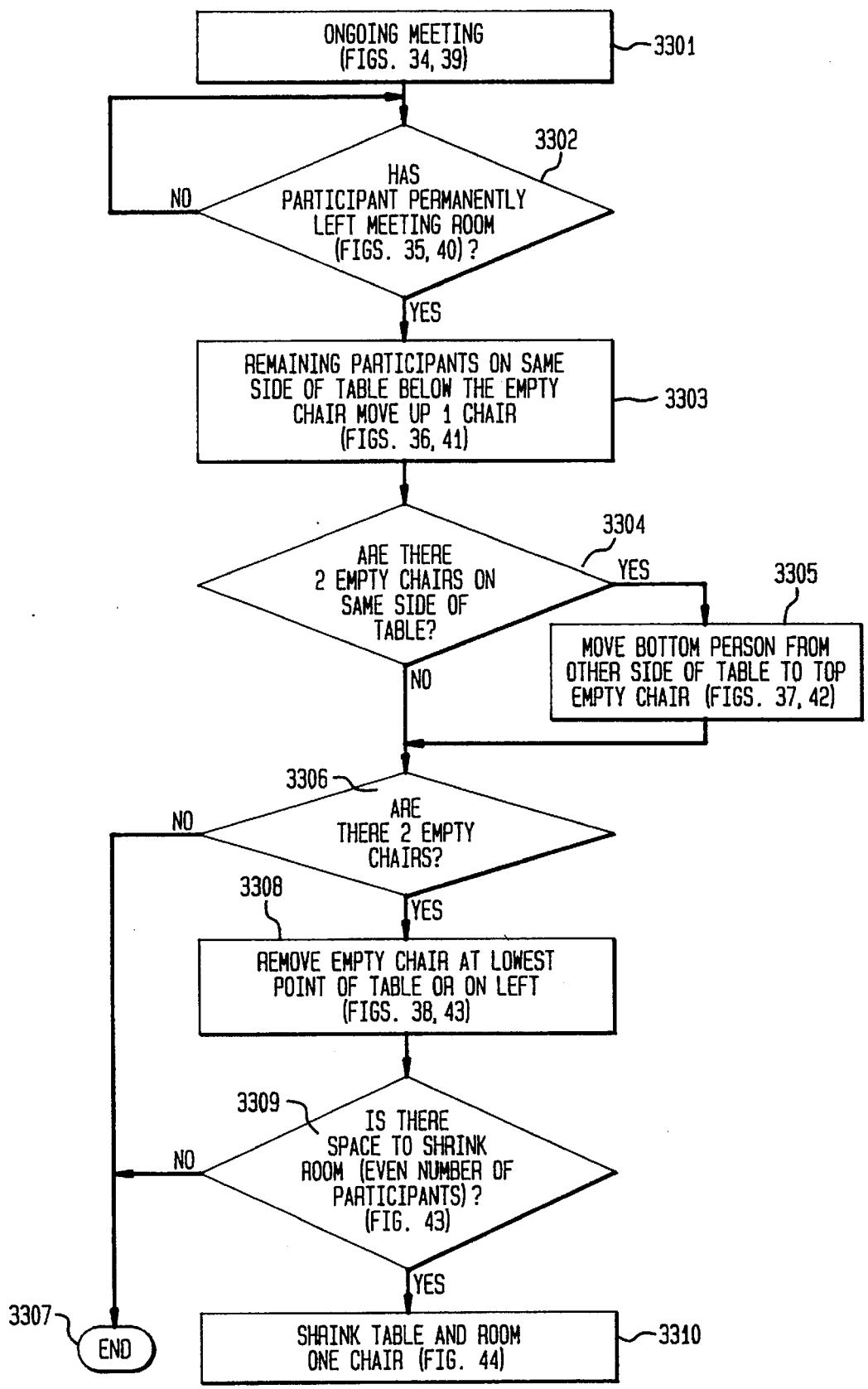
FIG. 33 is a flow chart illustrating the steps taken when a meeting participant permanently leaves the meeting room.
Figure 34:
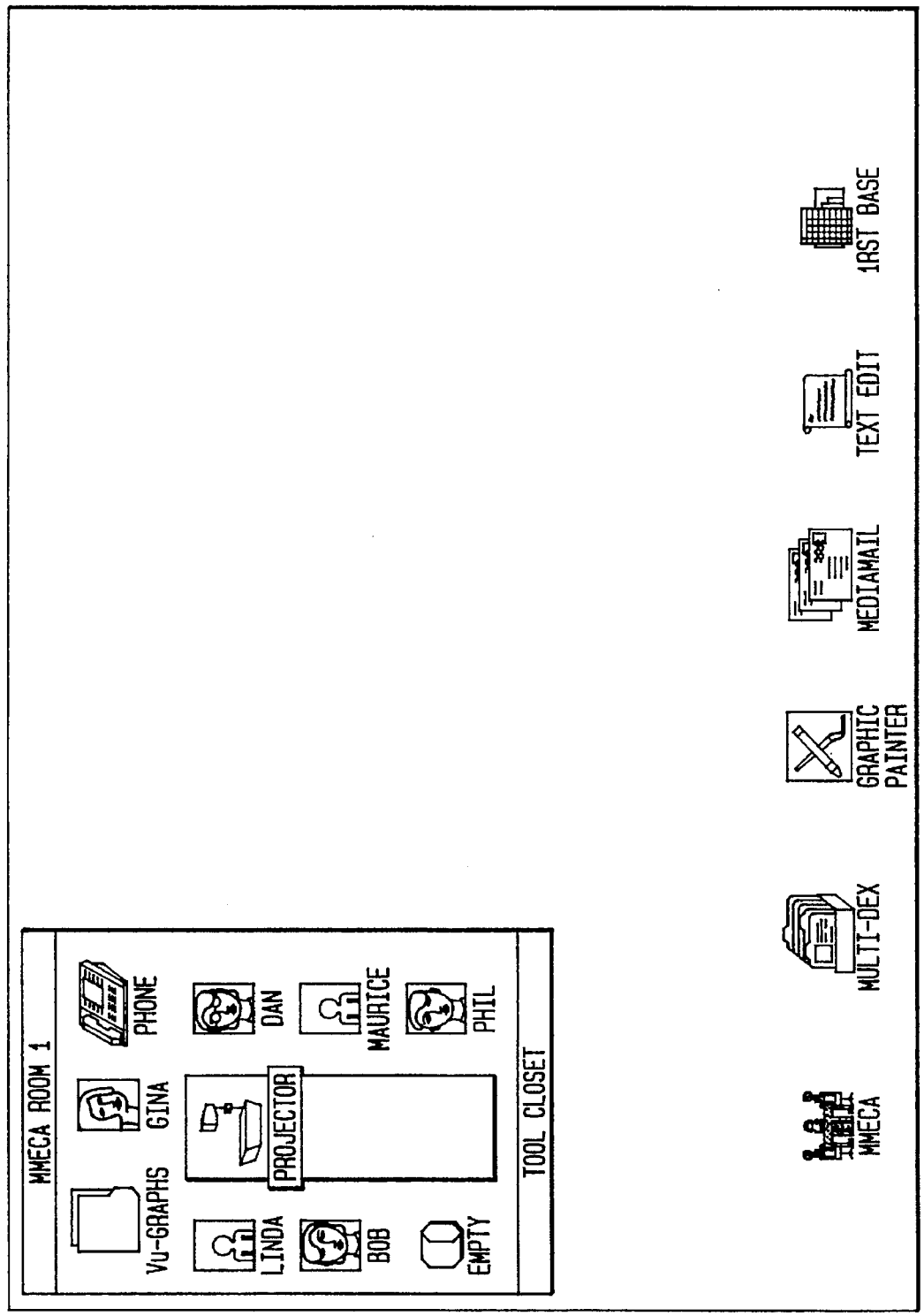
FIG. 34 is a graphical screen representation of an ongoing meeting including six participants.
Figure 35:
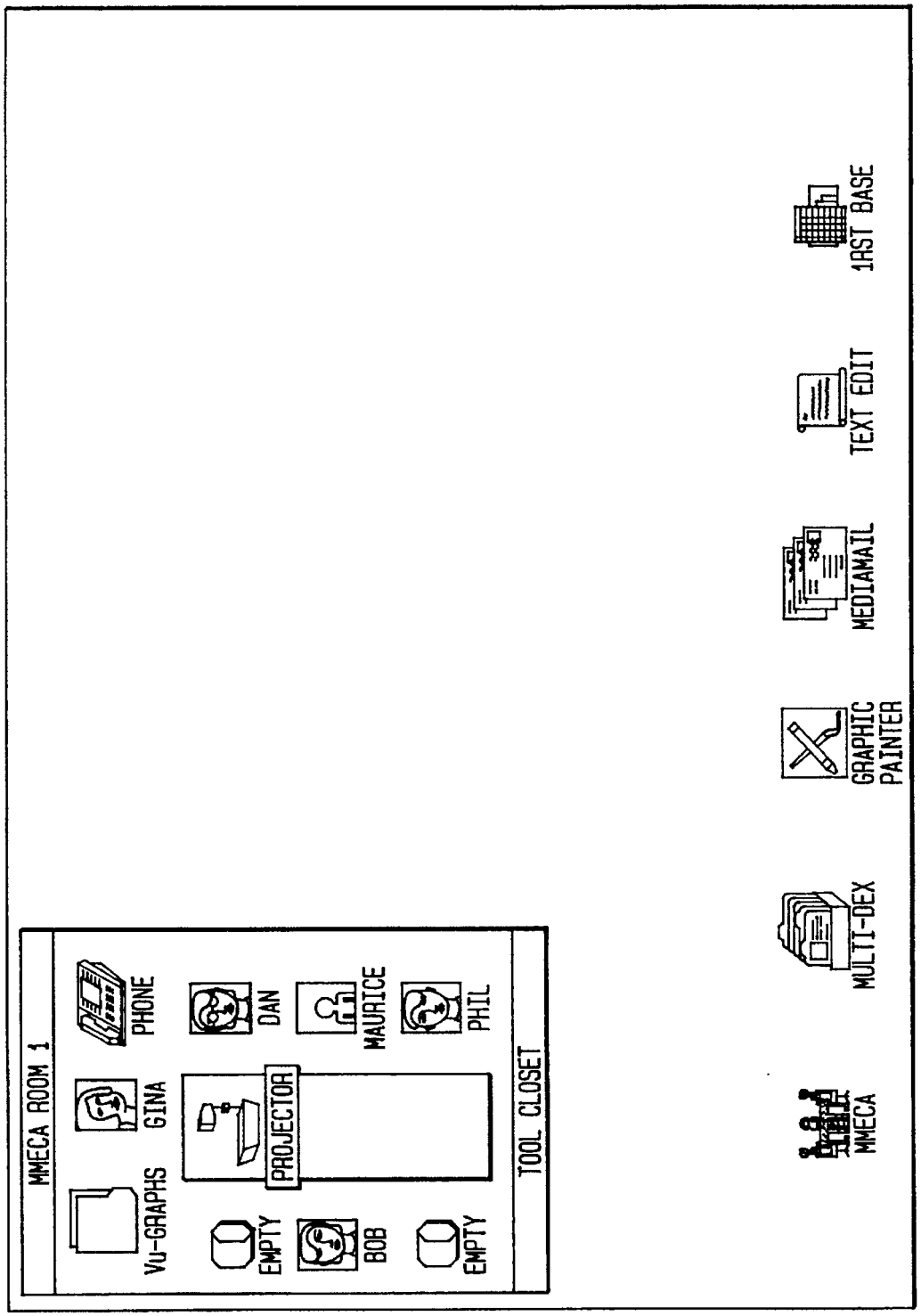
FIG. 35 is a graphical screen representation of the meeting shown in the screen of FIG. 34 upon a participant leaving that meeting.
Figure 36:
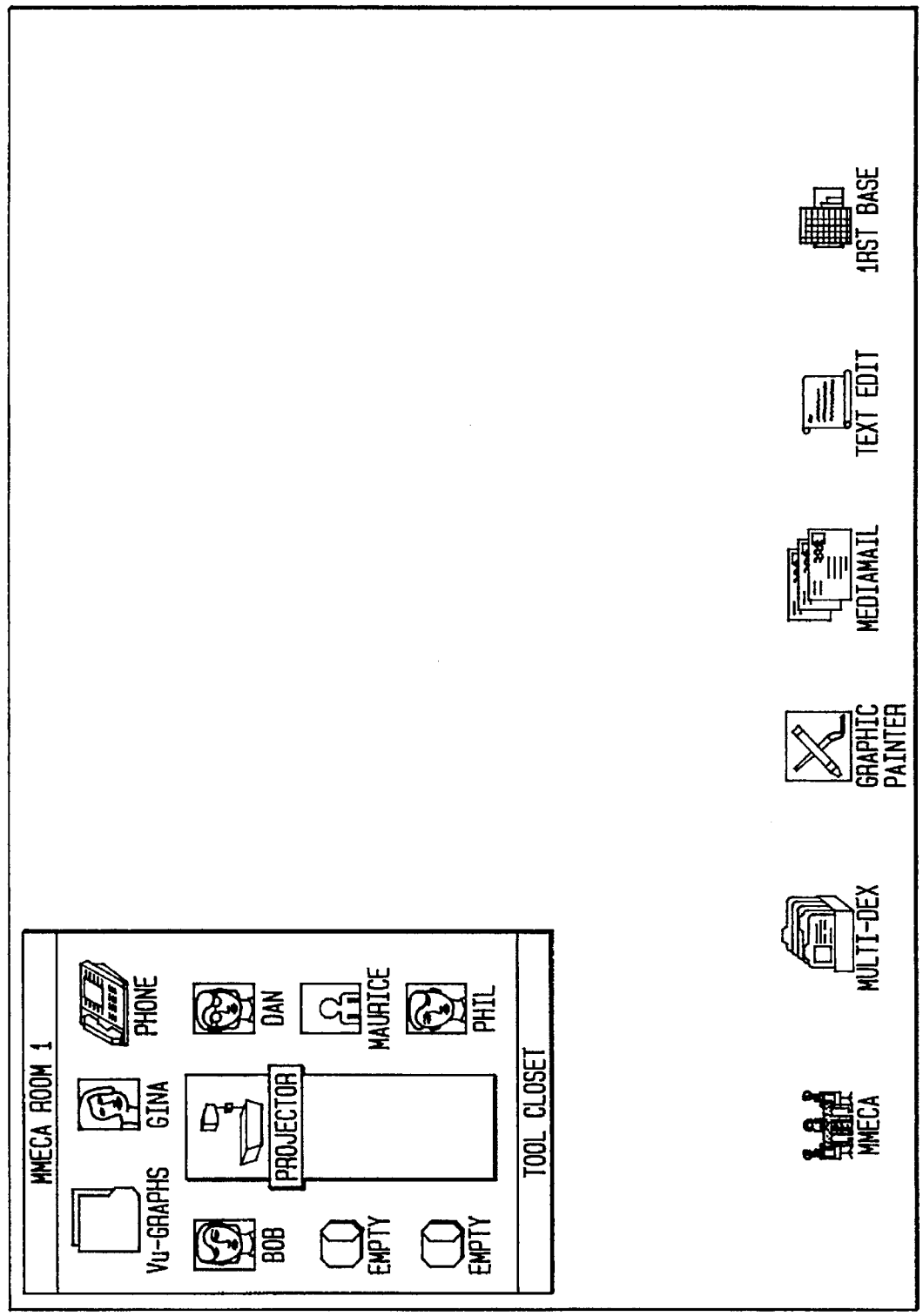
FIG. 36 is a graphical screen representation of the meeting shown in the screen of FIG. 35 with the chairs rearranged.
Figure 37:
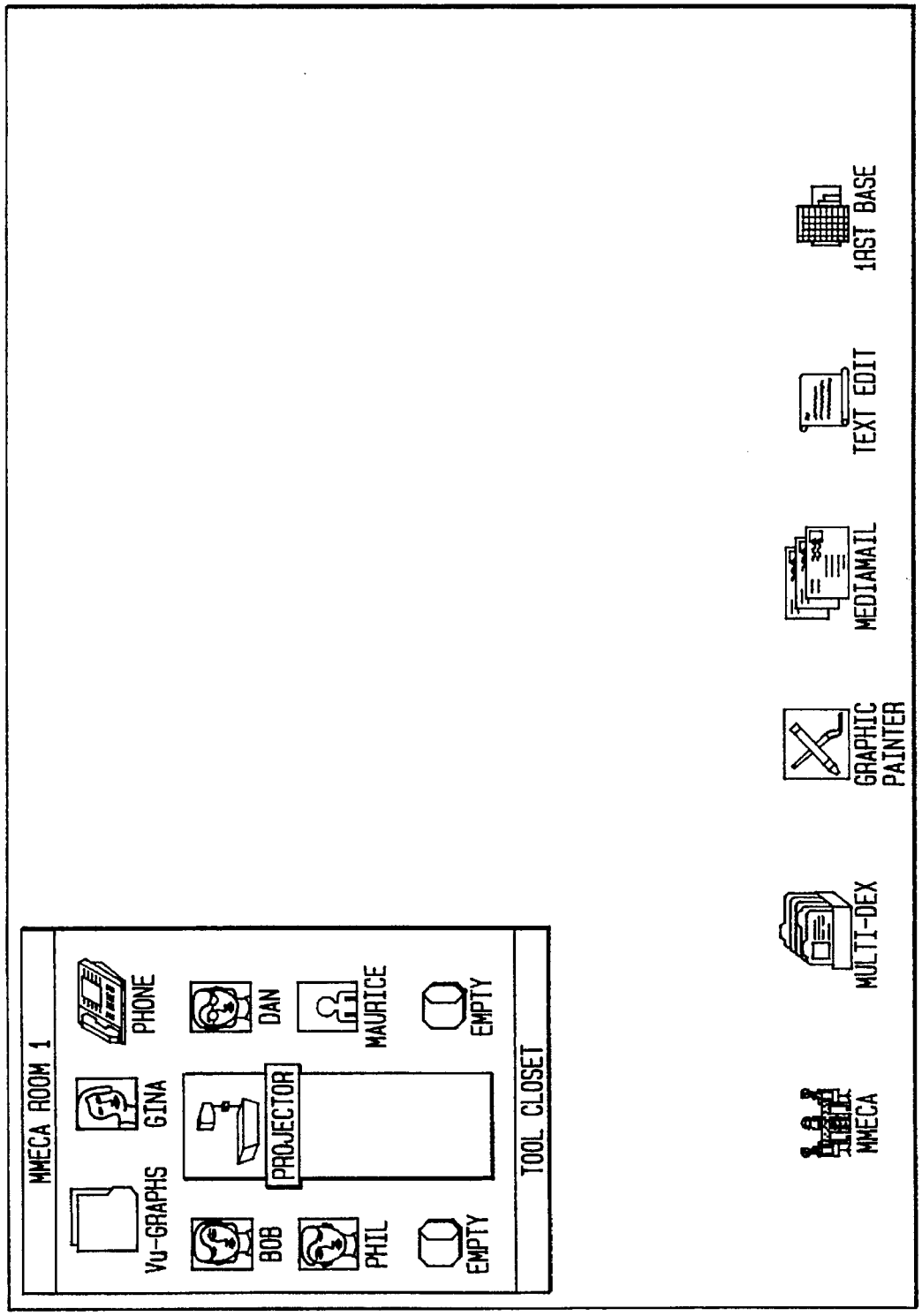
FIG. 37 is a graphical screen representation of the meeting with the participants rearranged around the table to fill in empty chairs.
Figure 38:
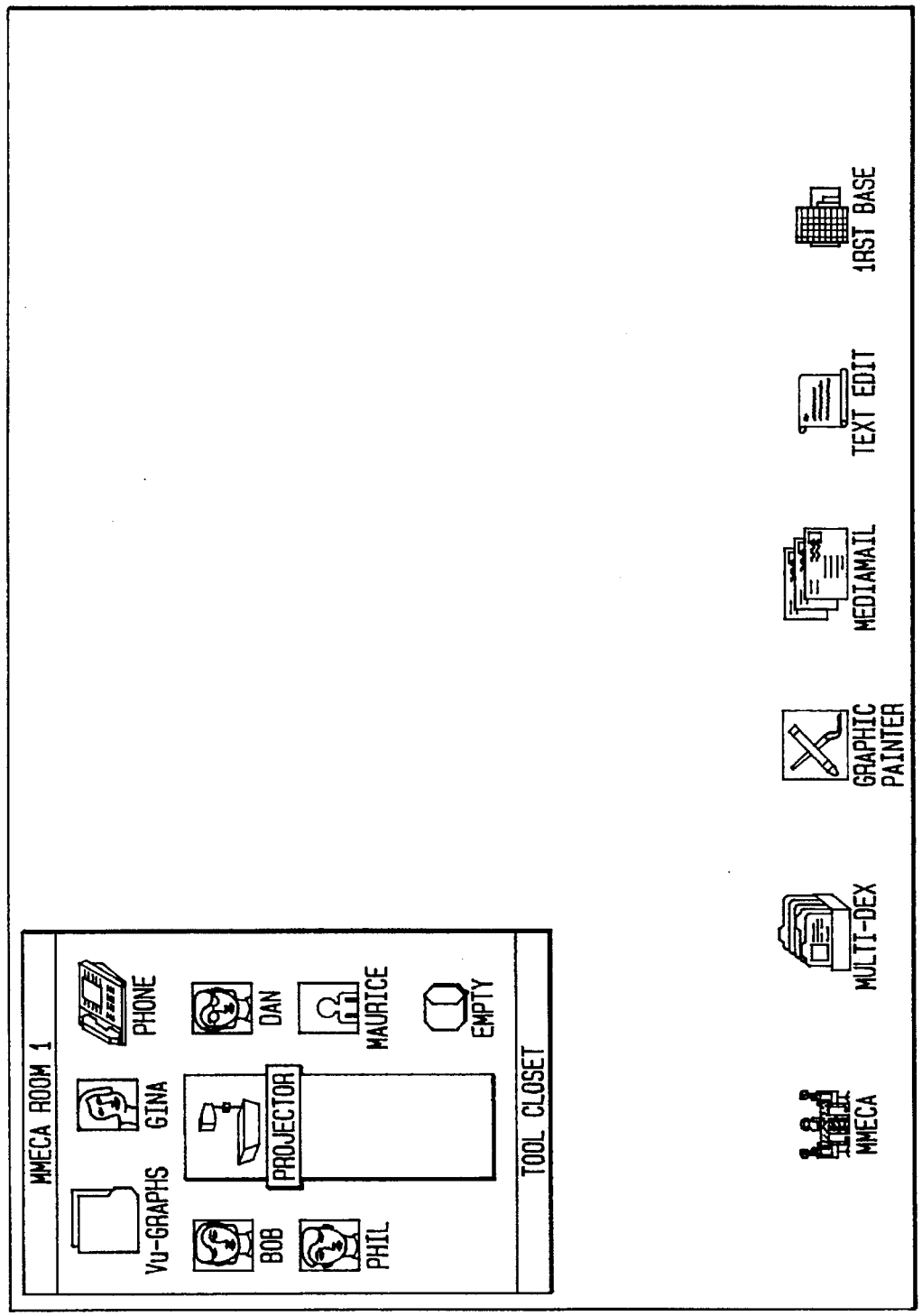
FIG. 38 is a graphical screen representation of the meeting shown in the screen of FIG. 37 with the extra empty chair being removed.
Figure 39:
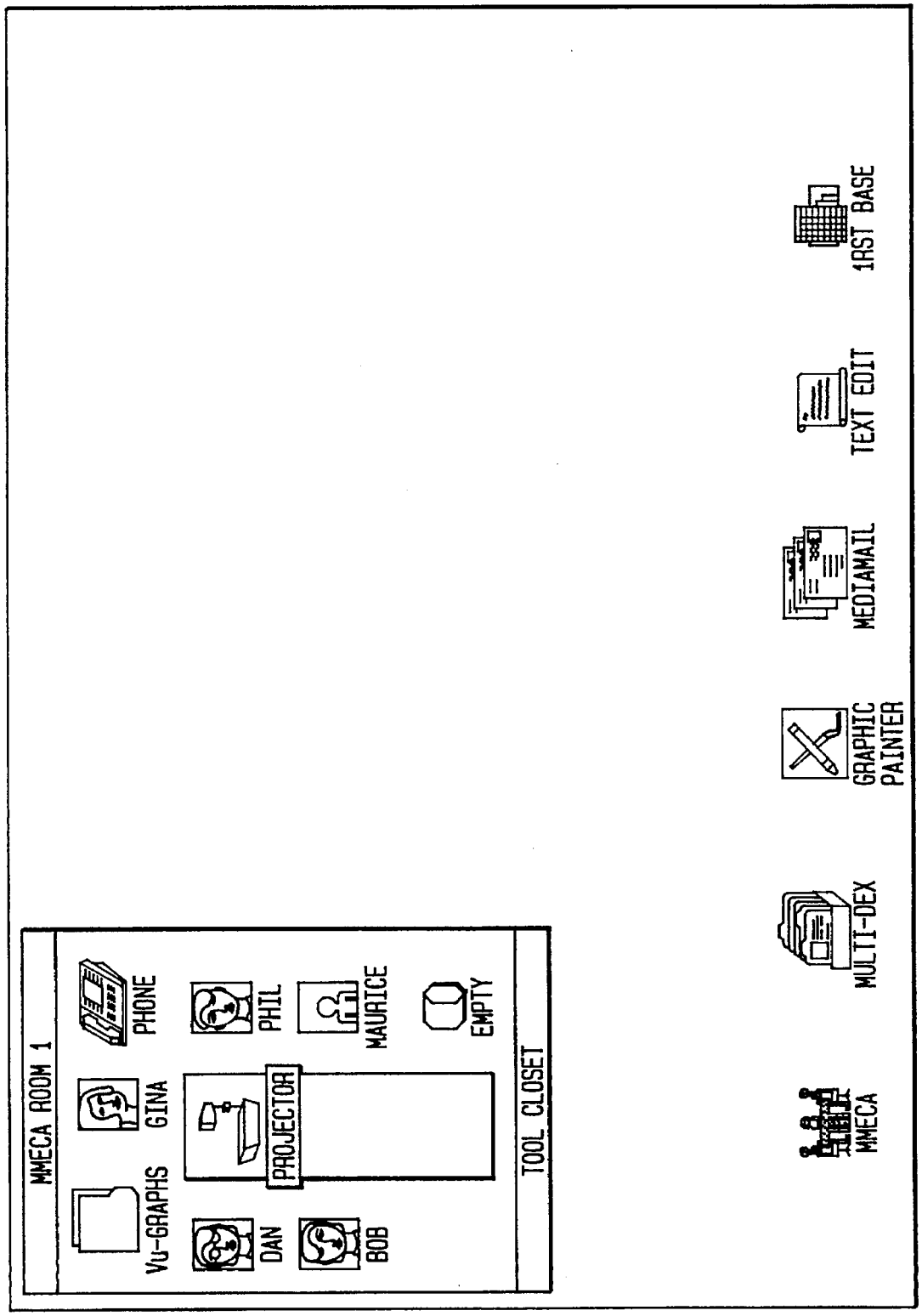
FIG. 39 is a graphical screen representation of an ongoing meeting including five participants.
Figure 40:
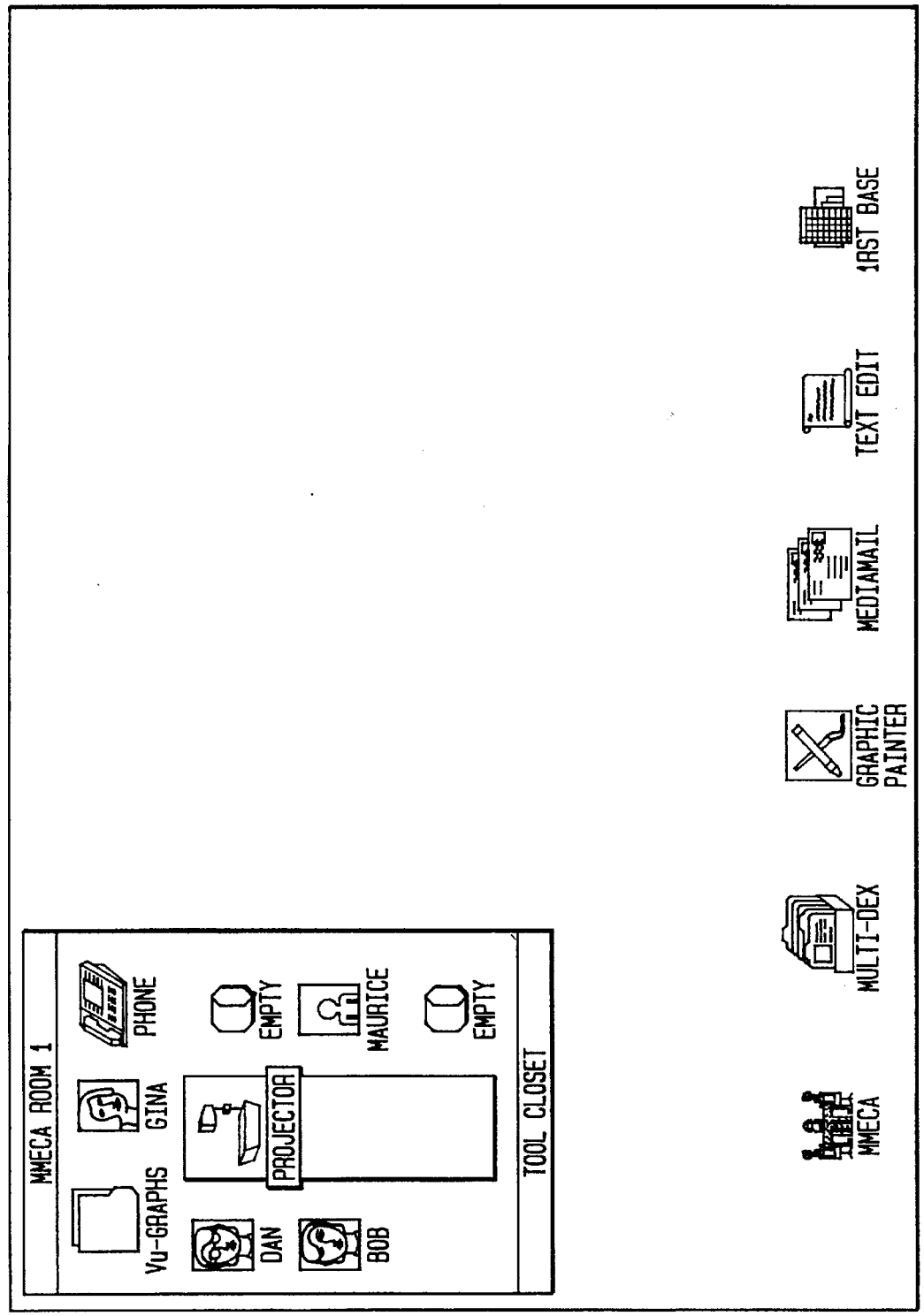
FIG. 40 is a graphical screen representation of the meeting shown in the screen of FIG. 39 upon a participant leaving that meeting.
Figure 41:
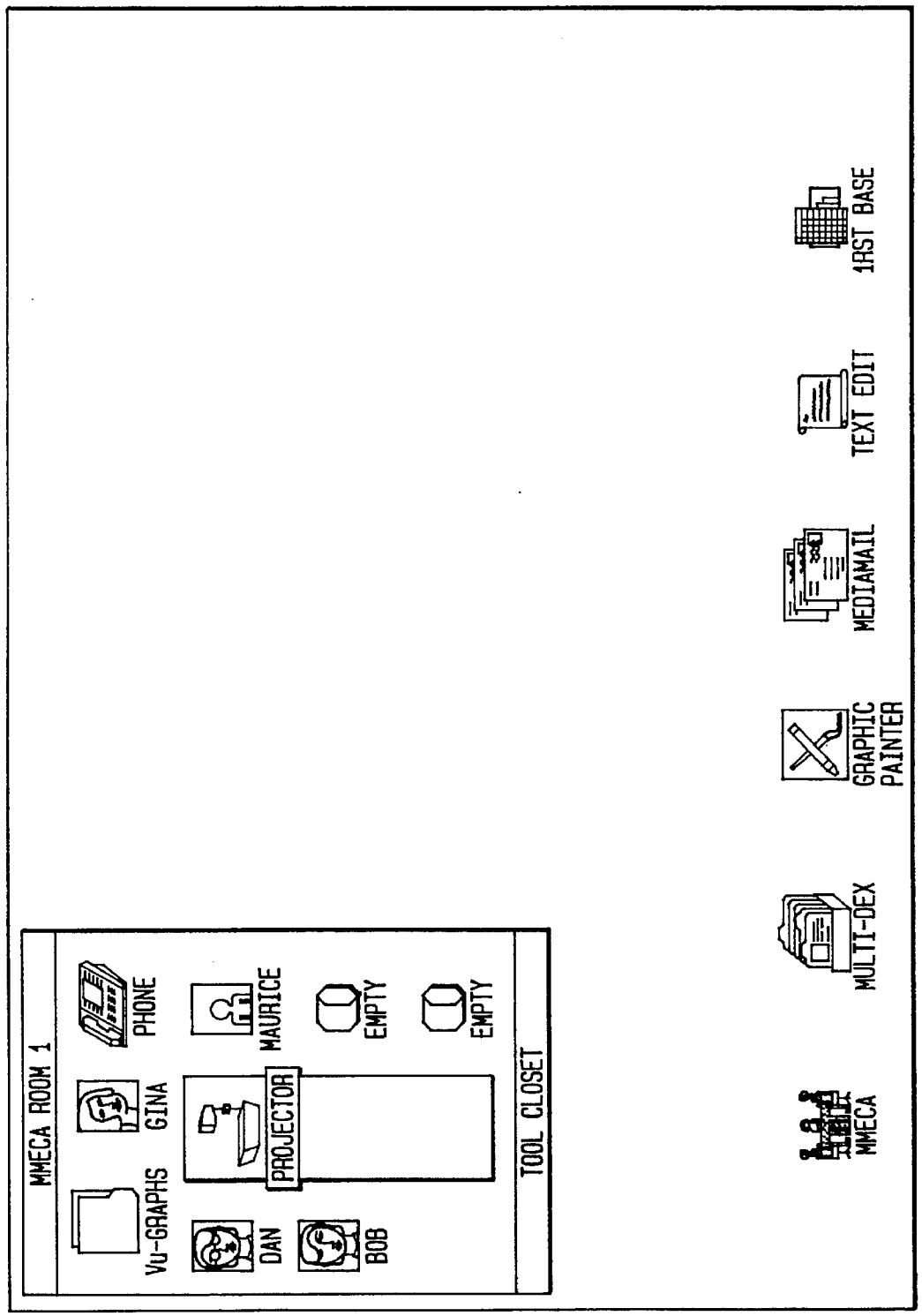
FIG. 41 is a graphical screen representation of the meeting shown in the screen of FIG. 40 with the chairs rearranged.
Figure 42:
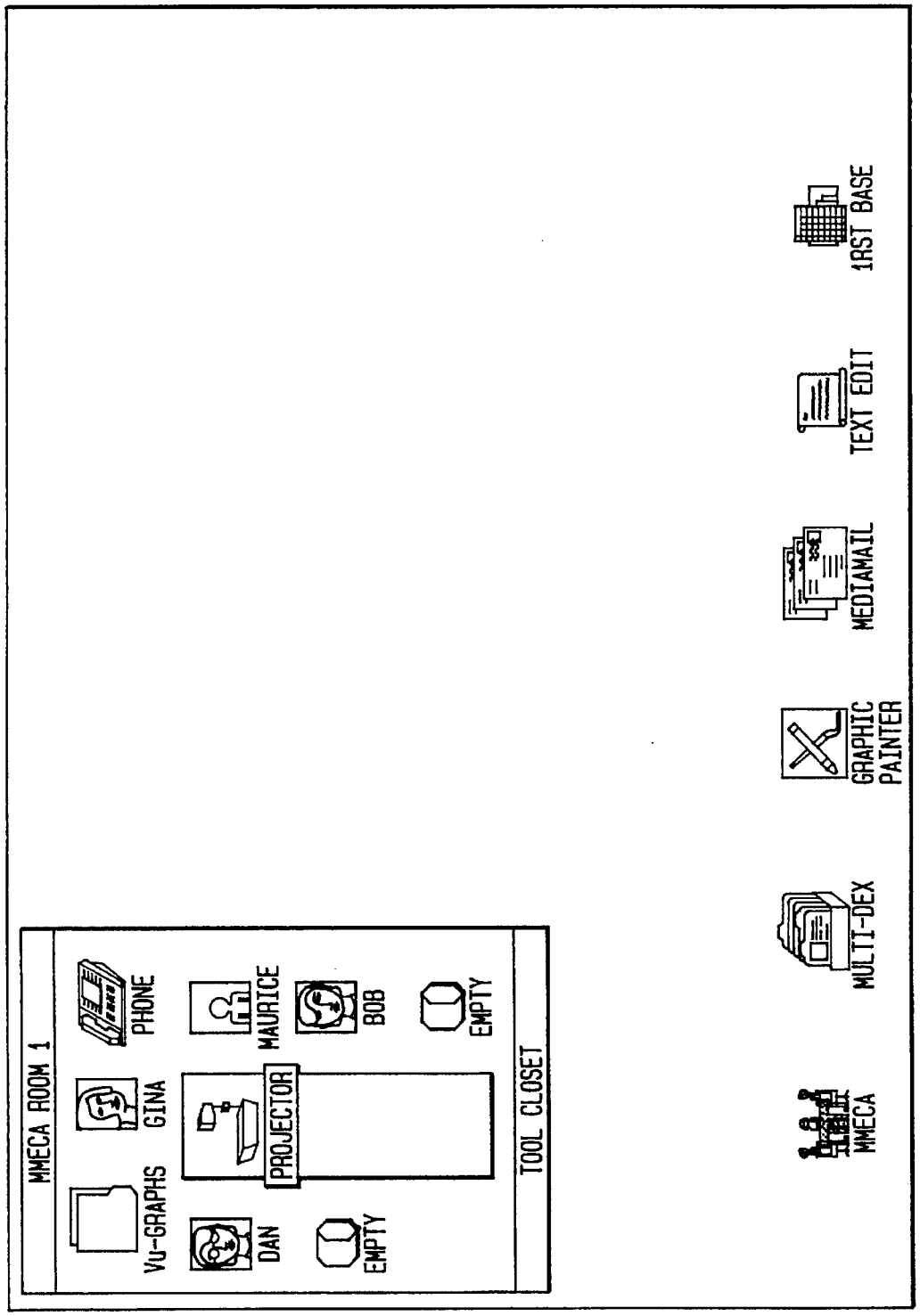
FIG. 42 is a graphical screen representation of the meeting with the participants rearranged around the table to fill in empty chairs.
Figure 43:
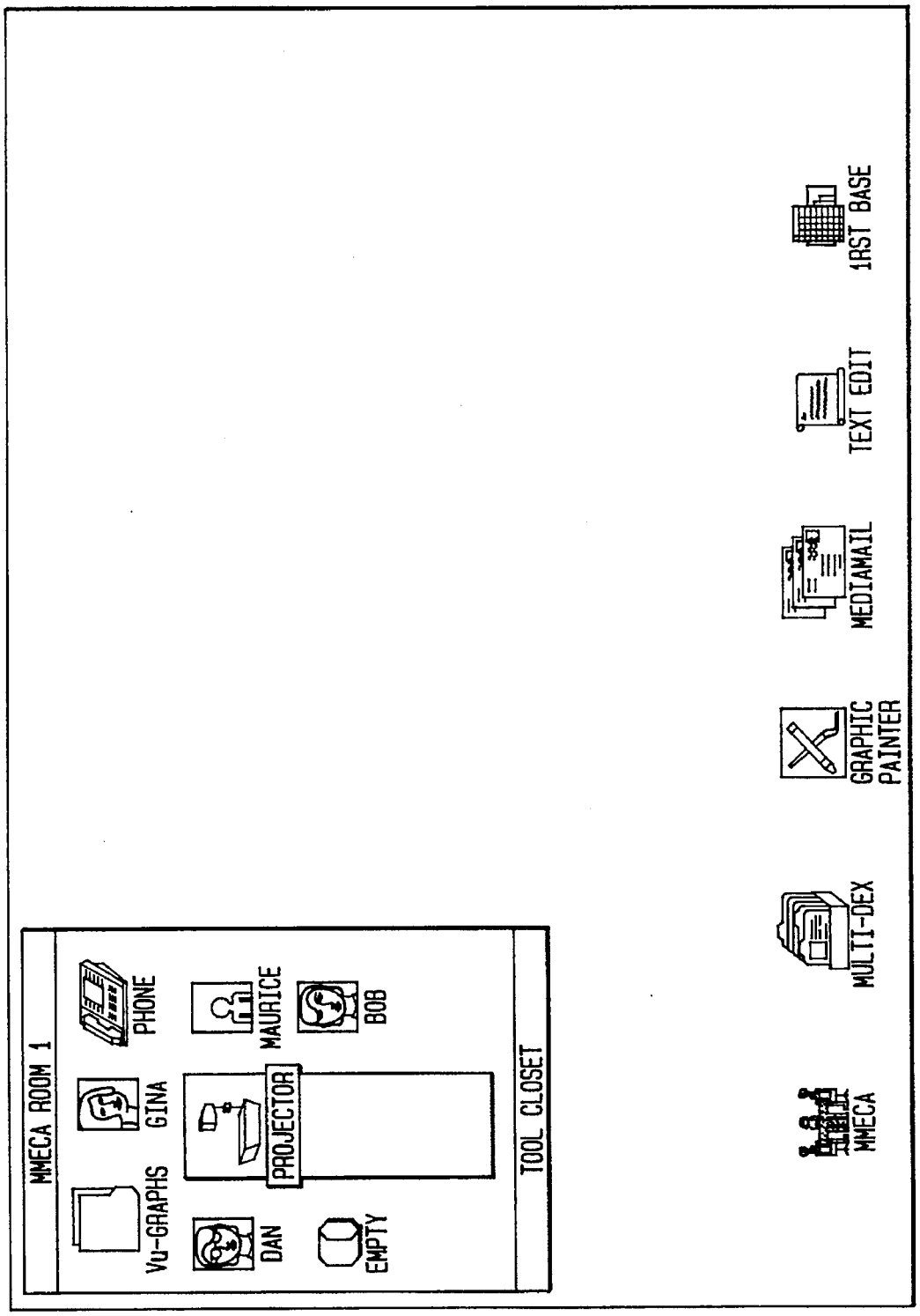
FIG. 43 is a graphical screen representation of the meeting shown in the screen of FIG. 42 with the extra empty chair being removed.

FIG. 33 is a flow chart illustrating the steps taken in the automatic reconfiguration of the meeting room and table when a participant permanently leaves the virtual meeting room. This process is initiated in step 3301 from an ongoing meeting having either an even number of participants, as shown in the screen of FIG. 34, or an odd number of participants, as shown in the screen of FIG. 39. Then, in step 3302, a test is made to determine whether a participant has permanently left the virtual meeting room, as shown in the screens of FIGS. 35 and 40, for the meeting shown in the screens of FIGS. 34 and 39, respectively. If a participant temporarily leaves the meeting (puts the call on hold) the room does not reconfigure and the particular participant's chair will remain empty until he or she returns. Step 3303 causes the meeting participants of the virtual meeting on the same side of the table below the empty chair of the participant who left to move up one chair, as illustrated in the screens of FIGS. 36 and 41. Thereafter, step 3304 tests whether or not there are two empty chairs on the same side of the table. If the test result in step 3304 is YES, step 3305 causes the person in the chair at the bottom of the table to move from the other side of the table to the top empty chair, as shown in the screens of FIGS. 37 and 42. Thereafter, control is passed to step 3306 which tests to determine whether or not them are two empty chairs around the table. Returning to step 3304, if the test result is NO, control is directly passed to step 3306. If the test result in step 3306 is NO, there is only one empty chair and the process is ended via step 3307. If the test result in step 3306 is YES, step 3308 causes an empty chair at the lowest point of the table or on the left side of the table to be removed, as shown in the screens of FIGS. 38 and 43. Then, step 3309 tests whether or not there is excess space at the bottom of the table so that the room and table can be shrunk in size, i.e. whether or not there is an even number of participants in the virtual meeting room, as shown in the screen of FIG. 43. If the test result in step 3309 is NO, the process is ended via step 3307. If the test result in step 3309 is YES, the table and room are shrunk by one chair space, as shown in the screen of FIG. 44, and the meeting is continued including the automatically reconfigured room and table.

We claim:

1. A method for use in a user workstation including a pointing device and a visual display unit to provide a graphical user interface for graphically depicting in a realistic manner setting up and/or handling of a multimedia call for a multimedia virtual meeting, comprising the steps of:

initiating a multimedia call from the user workstation to at least one prospective participant of the virtual meeting;

displaying in an area on a screen of the visual display unit at the user's workstation a graphical representation of a realistic virtual meeting room metaphor including realistic icons of at least a table, the user's image, at least one empty chair and a telephone, wherein the user's image icon and the at least one empty chair icon are positioned around the table icon in a realistic, real life manner mad the realistic telephone icon is for use in setting up a multimedia call to the at least one prospective virtual meeting participant, said empty chair being an indication that a prospective participant can be added to the virtual meeting;

filling the empty chair when a participant is added to the virtual meeting, adding an empty chair if a maximum number of participants has not been attained, adjusting the virtual meeting room display area on the users workstation screen to accommodate an added chair when that occurs, and causing the realistic icons to be arranged in the virtual meeting room metaphor being displayed so that the adjusted screen area displaying the virtual meeting room is minimized.

2. The method as defined in claim 1 further including the steps of selecting the realistic telephone icon and displaying a call bar on the screen in predetermined spatial relationship to the virtual meeting room metaphor in response to the selection of the telephone icon, the call bar including at least one option to be used in placing the multimedia call.

3. The method as defined in claim 2 wherein the call bar includes at least a dial pad option which can be employed in placing the multimedia call and an area for displaying a telephone number and further including the steps of selecting the dial pad option to place the multimedia call, displaying on the screen a realistic dial pad icon, inputting the at least one prospective participant's telephone number via the dial pad, displaying the telephone number being inputted in the call bar and causing the displayed number to be dialed.

4. The method as defined in claim 2 wherein the call bar includes at least a directory option which can be employed in placing the multimedia call and an area for displaying a telephone number, the directory including at least names and telephone numbers of individuals and further including the steps of selecting the directory option to place the multimedia call, displaying on the screen a realistic directory page icon, locating the name and telephone number in the directory of the at least one prospective participant, selecting the at least one prospective participant's telephone number from the directory, displaying the selected telephone number in the dial bar and causing the displayed number to be dialed.

5. The method as defined in claim 2 wherein the user workstation includes a keyboard having number keys and the call bar includes an area for displaying a telephone number and further including the steps of inputting the at least one prospective participant's telephone number via the keyboard number keys, displaying the telephone number being inputted in the dial bar and causing the displayed number to be dialed.

6. The method as defined in claim 1 further including the steps of selecting the realistic telephone icon and displaying a call bar on the screen in predetermined spatial relationship to the virtual meeting room metaphor in response to the selection of the telephone icon, the call bar including at least an area to display a telephone number to be dialed, supplying a telephone number of the at least one prospective participant to be dialed, displaying the supplied telephone number in the call bar area and causing the displayed number to be dialed, determining if the dialed number has been answered, if the dialed number is answered, removing the call bar from the display and displaying an image icon representative of the answering virtual meeting participant over the empty chair.

7. The method as defined in claim 6 further including the steps of determining if the number of participants in the virtual meeting is a maximum allowable number and if not, adding an empty chair at the table indicating that another prospective participant may be added to the virtual meeting.

8. The method as defined in claim 7 further including the steps of determining if the virtual meeting room and table need to be expanded to accommodate the added empty chair and, if so, expanding the size of the virtual meeting room and table to accommodate the added empty chair while keeping the virtual meeting room display area at a minimum size in order to accommodate the added empty.

9. The method as defined in claim 6 wherein a number of virtual meeting participants have been called and have been added to the virtual meeting with an image icon of each of the number of the added participants being placed over a respective chair around the table icon and further including the steps of determining if one or more of the virtual meeting participants have left the virtual meeting, if so, removing the image icons of the one or more participants that have left and displaying empty chairs around the table icon in place of the removed one or more image icons.

10. The method as defined in claim 9 further including the steps of rearranging the image icons around the table icon of the remaining virtual meeting participants to fill the one or more empty chairs if they are above the image icons of the remaining participants, if there are more than one empty chairs, removing all but one of the empty chairs, determining if there is space to shrink the length of the displayed virtual meeting room and, if so, shrinking the length of the virtual meeting room and the table to a length long enough to accommodate the image icons of the remaining virtual meeting participants and the one empty chair so that the virtual meeting room display area is kept to a minimum.

11. The method as defined in claim 1 wherein the meeting room includes a tool closet including tools to be employed in the multimedia virtual meeting for collaboration and/or communication among the virtual meeting participants, the tool closet being initially in a closed condition so that the screen area displaying the virtual meeting room is minimized.

12. The method as defined in claim 11 further including the steps of opening the tool closet and displaying on the screen realistic icons of the multimedia tools so that any one of the virtual meeting participants having a workstation including a pointing device and a visual display unit may select a tool from the opened tool closet to collaborate and/or communicate with one or more of the virtual meeting participants.

13. The method as defined in claim 1 wherein the step of adjusting further includes decreasing the display area of the virtual meeting being displayed on the user's workstation screen upon removal of an empty chair from the virtual meeting being displayed so that the adjusted display area is kept at a minimum.

14. Apparatus for use in a user workstation including a pointing device and a visual display unit to provide a graphical user interface for graphically depicting in a realistic manner setting up and/or handling of a multimedia call for a multimedia virtual meeting, comprising:

means for initiating a multimedia call from the user workstation to at least one prospective participant of the virtual meeting;

means for displaying in an area on a screen of the visual display unit at the user's workstation a graphical representation of a realistic virtual meeting room metaphor including realistic icons of at least a table, the user's image, at least one empty chair and a telephone, wherein the user's image icon and the at least one empty chair icon are positioned around the table icon in a realistic, real life manner and the realistic telephone icon is for use in setting up a multimedia call to the at least one prospective virtual meeting participant; said empty chair being an indication that a prospective participant can be added to the virtual meeting;

means for filling the empty chair when a participant is added to the virtual meeting, means for adding an empty chair if a maximum number of participants has not been attained, means for adjusting the virtual meeting room display area on the users workstation screen to accommodate an added chair when that occurs, and means for causing the realistic icons to be arranged in the virtual meeting room metaphor being displayed so that the adjusted screen area displaying the virtual meeting room is minimized.

15. The apparatus as defined in claim 14 further including means for selecting the realistic telephone icon and means for displaying a call bar on the screen in predetermined spatial relationship to the virtual meeting room metaphor in response to the selection of the telephone icon, the call bar including at least one option to be used in placing the multimedia call.

16. The apparatus as defined in claim 15 wherein the call bar includes at least a dial pad option which can be employed in placing the multimedia call and an area for displaying a telephone number and further including means for selecting the dial pad option to place the multimedia call, means for displaying on the screen a realistic dial pad icon to input the at least one prospective participant's telephone number via the dial pad, means for displaying the telephone number being inputted in the dial bar and means for causing the displayed number to be dialed.

17. The apparatus as defined in claim 15 wherein the call bar includes at least a directory option which can be employed in placing the multimedia call and an area for displaying a telephone number, the directory including at least names and telephone numbers of individuals and further including means for selecting the directory option to place the multimedia call, means for displaying on the screen a realistic directory page icon, means for locating the name and telephone number in the directory of the at least one prospective participant, means for selecting the at least one prospective participant's telephone number from the directory, means for displaying the selected telephone number in the dial bar and means for causing the displayed number to be dialed.

18. The apparatus as defined in claim 15 wherein the user workstation includes a keyboard having number keys and the call bar includes an area for displaying a telephone number and further including the keyboard to be used to input the at least one prospective participant's telephone number via the keyboard number keys, means for displaying an inputted telephone number in the dial bar and means for causing the displayed number to be dialed.

19. The apparatus as defined in claim 14 further including means for selecting the realistic telephone icon and means for displaying a call bar on the screen in predetermined spatial relationship to the virtual meeting room metaphor in response to the selection of the telephone icon, the call bar including at least an area to display a telephone number to be dialed, means for supplying a telephone number of the at least one prospective participant to be dialed, means for displaying the supplied telephone number in the call bar area and means for causing the displayed number to be dialed, means for determining if the dialed number has been answered, and means for removing the call bar from the display upon the call being answered and for displaying an image icon representative of the answering virtual meeting participant over the empty chair.

20. The apparatus as defined in claim 19 further including means for determining if the number of participants in the virtual meeting is a maximum allowable number and means for adding an empty chair at the table indicating that another prospective participant may be added to the virtual meeting when the number of participants in the virtual meeting is less than the maximum.

21. The apparatus as defined in claim 20 further including means for determining if the virtual meeting room and table need to be expanded to accommodate the added empty chair and means for expanding the size of the virtual meeting room and table to accommodate the added empty chair while keeping the virtual meeting room display area at a minimum size in order to accommodate the added empty chair.

22. The apparatus as defined in claim 19 wherein a number of virtual meeting participants have been called and have been added to the virtual meeting with an image icon of each of the number of the added participants being placed over a respective chair around the table icon and further including means for determining if one or more of the virtual meeting participants have left the virtual meeting, means for removing the image icons of the one or more participants that have left the virtual meeting and for displaying empty chairs around the table icon in place of the removed one or more image icons.

23. The apparatus as defined in claim 22 further including means for rearranging the image icons around the table icon of the remaining virtual meeting participants to fill the one or more empty chairs if they are above the image icons of the remaining participants, the means for removing removes all but one of the empty chairs, means for determining if there is space to shrink the length of the displayed virtual meeting room and means for shrinking the length of the virtual meeting room and the table to a length long enough to accommodate the image icons of the remaining virtual meeting participants and the one empty chair so that the virtual meeting room display area is kept to a minimum.

24. The apparatus as defined in claim 14 wherein the meeting room includes a tool closet including tools to be employed in the multimedia virtual meeting for collaboration and/or communication among the virtual meeting participants, the tool closet being initially in a closed condition so that the screen area displaying the virtual meeting room is minimized.

25. The apparatus as defined in claim 24 further including means for opening the tool closet and for displaying on the screen realistic icons of the multimedia tools so that any one of the virtual meeting participants having a workstation including a pointing device and a visual display unit may select a tool from the opened tool closet to collaborate and/or communicate with one or more of the virtual meeting participants.

26. The apparatus as defined in claim 14 wherein the means for adjusting further includes means for decreasing the display area of the virtual meeting being displayed on the user's workstation screen upon removal of an empty chair from the virtual meeting being displayed so that the adjusted display area is kept at a minimum.

\* \* \* \* \*